United States Patent
Lee

(10) Patent No.: US 11,463,723 B2
(45) Date of Patent: Oct. 4, 2022

(54) METHOD FOR ENCODING/DECODING IMAGE SIGNAL AND DEVICE THEREFOR

(71) Applicant: APPLE INC., Cupertino, CA (US)

(72) Inventor: Bae Keun Lee, Seongnam-si (KR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/056,307

(22) PCT Filed: Dec. 26, 2019

(86) PCT No.: PCT/KR2019/018500
§ 371 (c)(1),
(2) Date: Nov. 17, 2020

(87) PCT Pub. No.: WO2020/138967
PCT Pub. Date: Jul. 2, 2020

(65) Prior Publication Data
US 2021/0258603 A1   Aug. 19, 2021

(30) Foreign Application Priority Data
Dec. 26, 2018  (KR) ................ 10-2018-0169169

(51) Int. Cl.
*H04N 19/52* (2014.01)
*H04N 19/107* (2014.01)
(Continued)

(52) U.S. Cl.
CPC ........... *H04N 19/52* (2014.11); *H04N 19/107* (2014.11); *H04N 19/122* (2014.11); *H04N 19/184* (2014.11)

(58) Field of Classification Search
CPC ...................................................... H04N 19/52
(Continued)

(56) References Cited

U.S. PATENT DOCUMENTS 9,843,820 B2   12/2017   Lin et al.
10,448,010 B2   10/2019   Chen et al.
(Continued)

FOREIGN PATENT DOCUMENTS

| WO | 2018/061563 A1 | 4/2018 |
| WO | 2018/084523 A1 | 5/2018 |
| WO | 2018/226066 A1 | 12/2018 |

OTHER PUBLICATIONS

International Preliminary Report on Patentability in International Appln. No. PCT/KR2019/018500, dated Jul. 8, 2021, 12 pages (with English Translation).

(Continued)

*Primary Examiner* — Yulin Sun
(74) *Attorney, Agent, or Firm* — Fish & Richardson P.C.

(57) ABSTRACT

An image decoding method according to the present invention may comprise the steps of: generating an affine mergence candidate list for a current block; specifying one of multiple affine mergence candidates contained in the affine mergence candidate list; deriving affine seed vectors of the specified mergence candidate; deriving a sub-block motion vector for a sub-block in the current block by using the affine seed vectors, wherein the sub-block is smaller in size than the current block; deriving offset data for the sub-block; and generating a sub-prediction block for the sub-block on the basis of the affine vector and the offset data.

10 Claims, 22 Drawing Sheets

(51) Int. Cl.
*H04N 19/122* (2014.01)
*H04N 19/184* (2014.01)

(58) Field of Classification Search
USPC ..................................................... 375/240.16
See application file for complete search history.

(56) References Cited

U.S. PATENT DOCUMENTS

| | | |
|---|---|---|
| 2014/0241434 A1 | 8/2014 | Lin et al. |
| 2015/0201216 A1 | 7/2015 | Lin et al. |
| 2018/0098063 A1* | 4/2018 | Chen .................... H04N 19/139 |
| 2019/0028731 A1* | 1/2019 | Chuang ................ H04N 19/105 |
| 2019/0281285 A1* | 9/2019 | Piao .................... H04N 19/129 |
| 2020/0021814 A1* | 1/2020 | Xu ....................... H04N 19/149 |
| 2020/0045310 A1 | 2/2020 | Chen et al. |
| 2021/0195234 A1* | 6/2021 | Zhang ................... H04N 19/52 |

OTHER PUBLICATIONS

International Search Report and Written Opinion in International Appln. No. PCT/KR2019/018500, dated Apr. 1, 2020, 14 pages (with English Translation).

* cited by examiner

【FIG. 1】
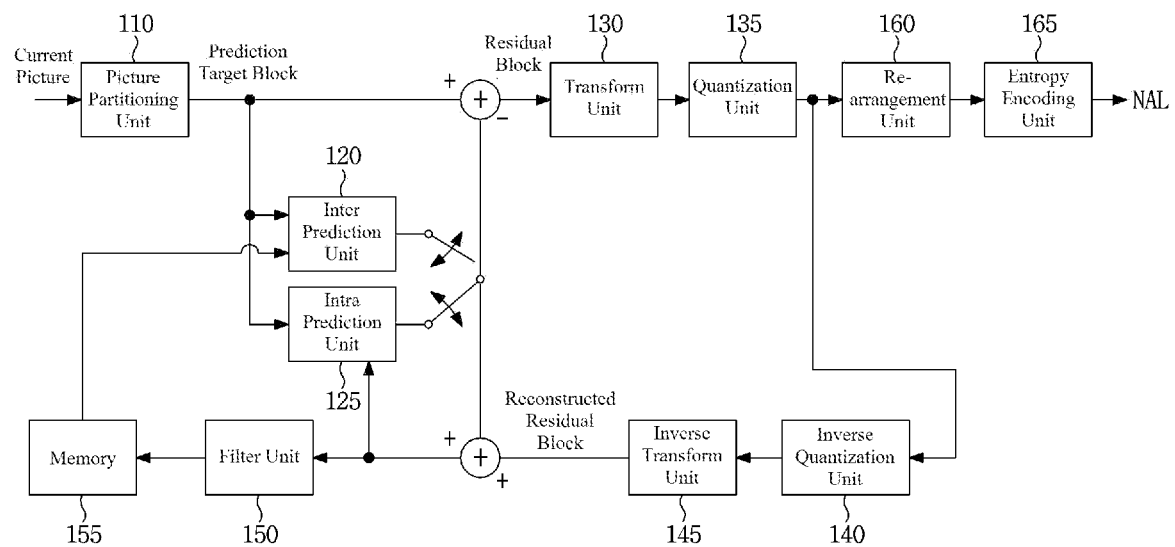
【FIG. 2】
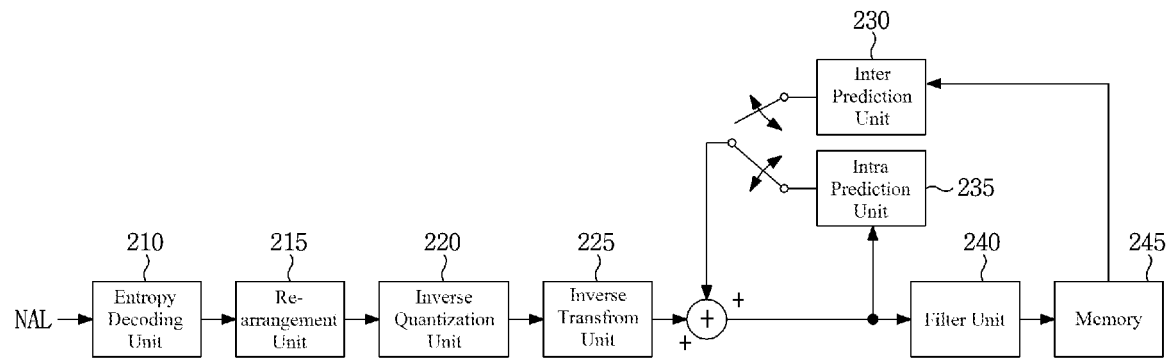

[FIG. 3]
[FIG. 4]
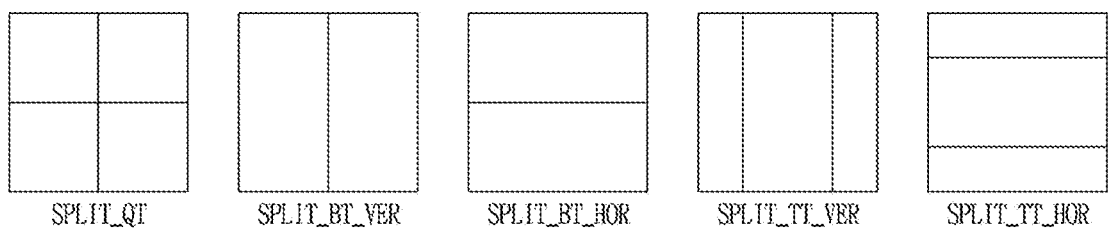
[FIG. 5]
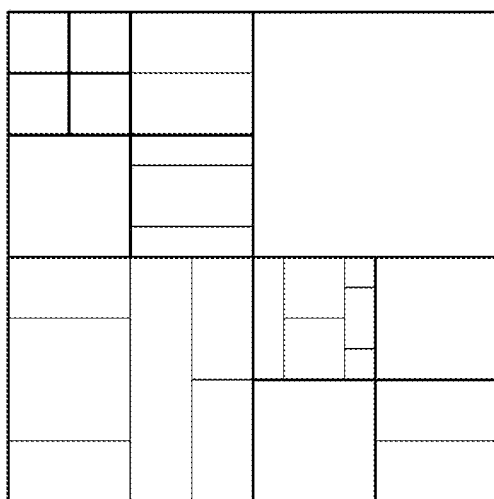

[FIG. 6]
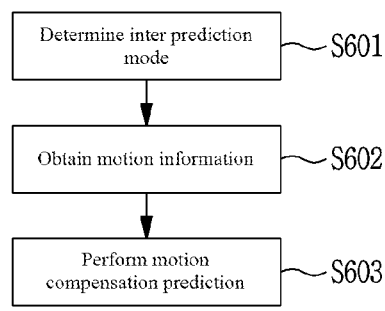
[FIG. 7]
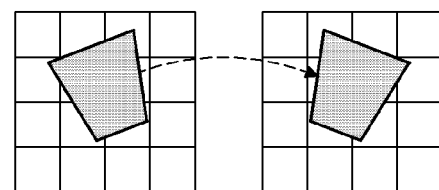
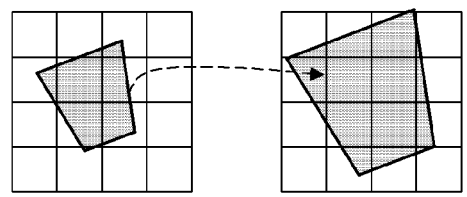
Rotation　　　　　　　　　　Zoom-in
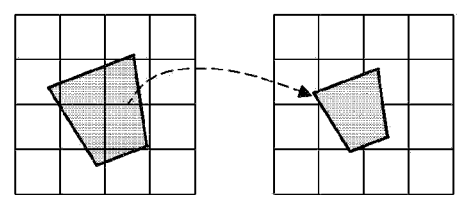
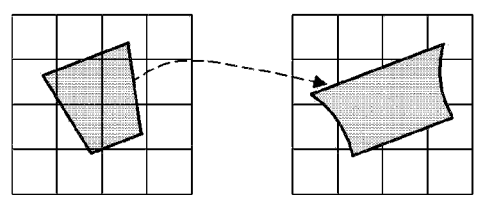
Zoom-out　　　　　　　　　　Affine transform

[FIG. 8]
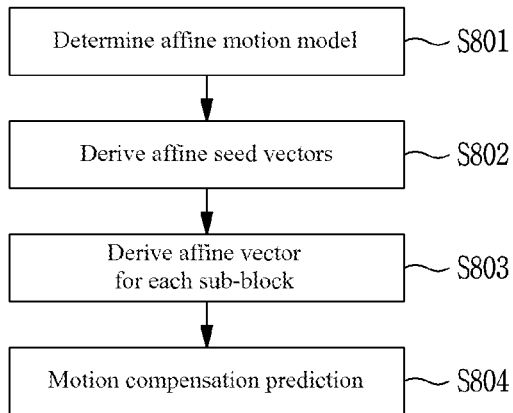
[FIG. 9]
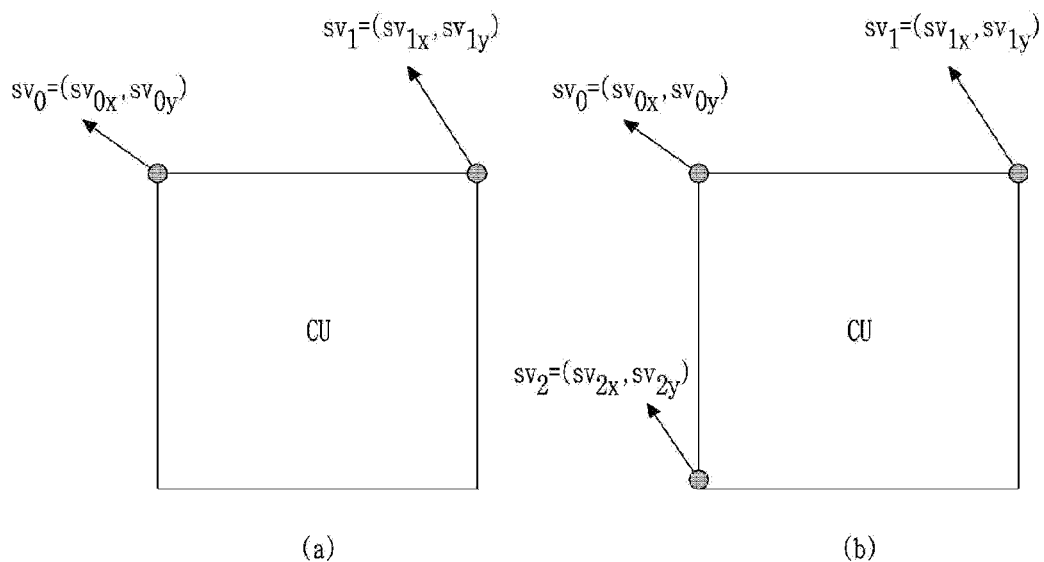

【FIG. 10】
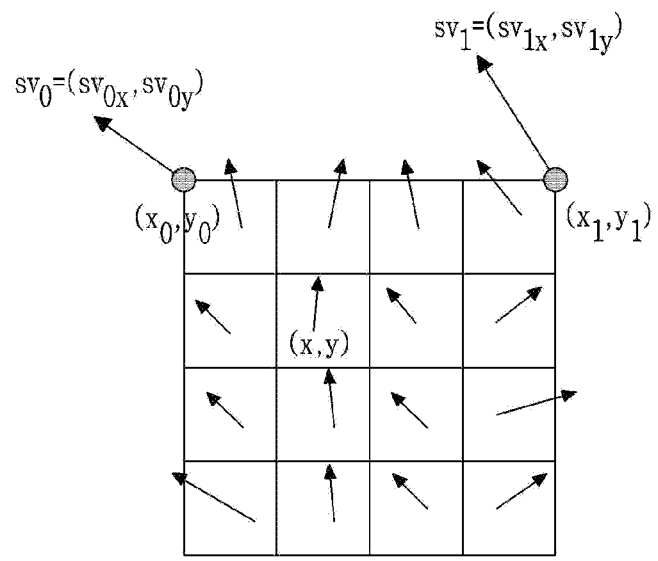
【FIG. 11】
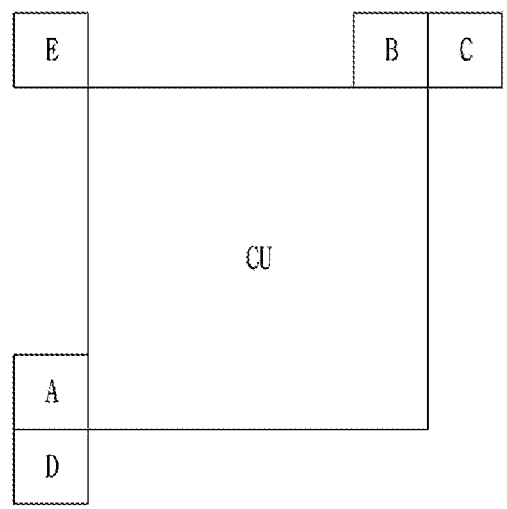

[FIG. 12]
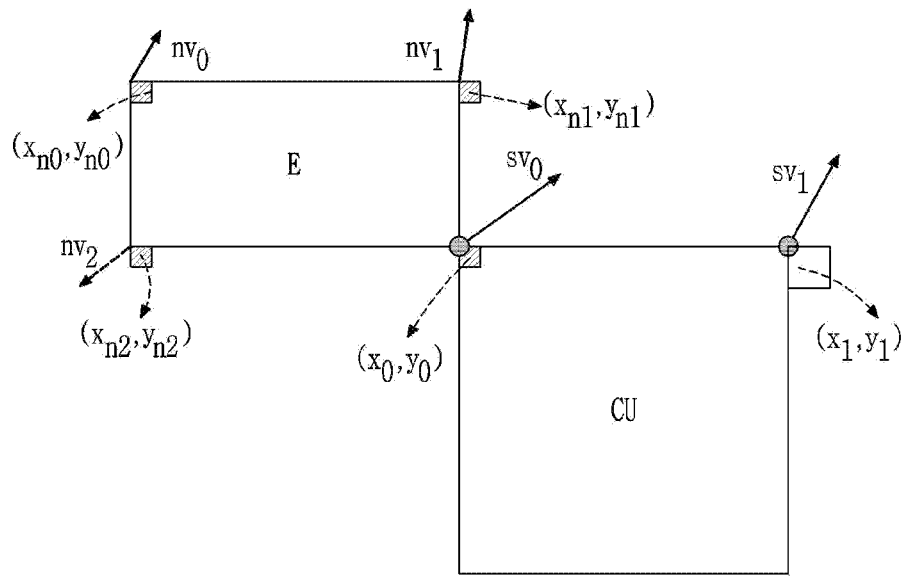
[FIG. 13]
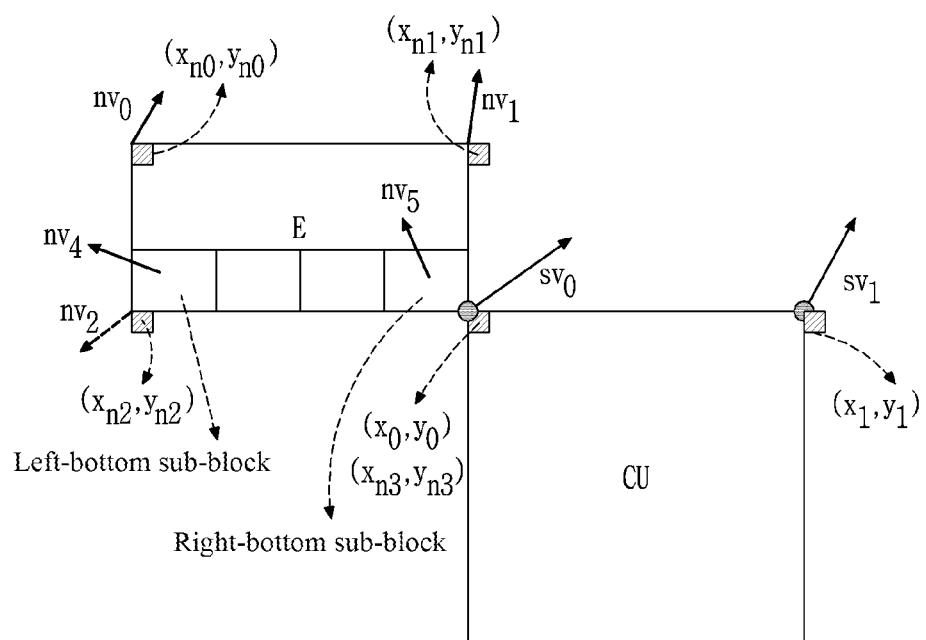

[FIG. 14]
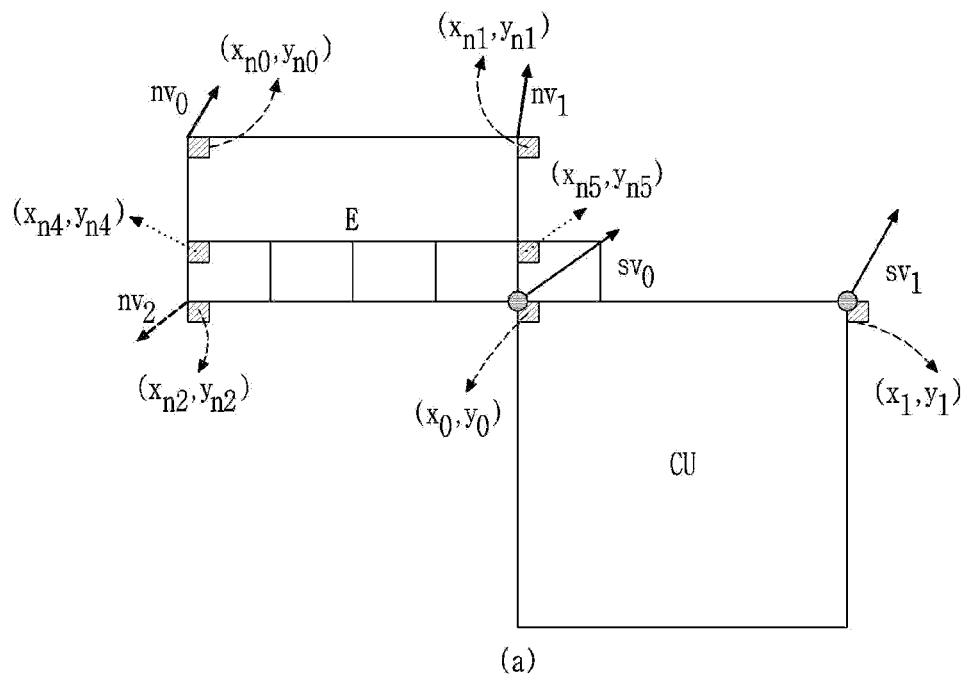
(a)
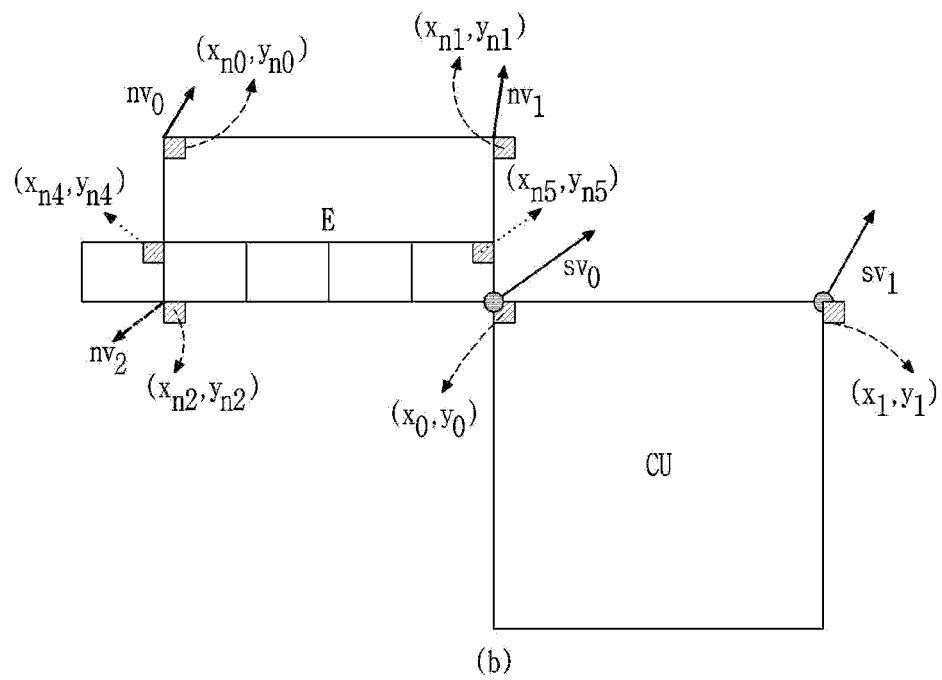
(b)

[FIG. 15]
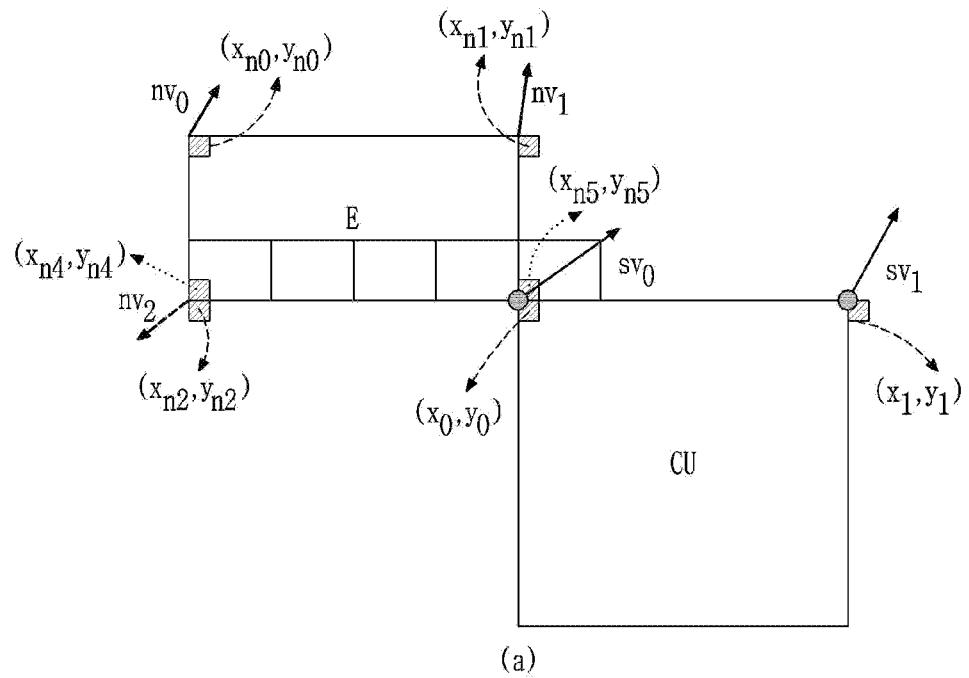
(a)
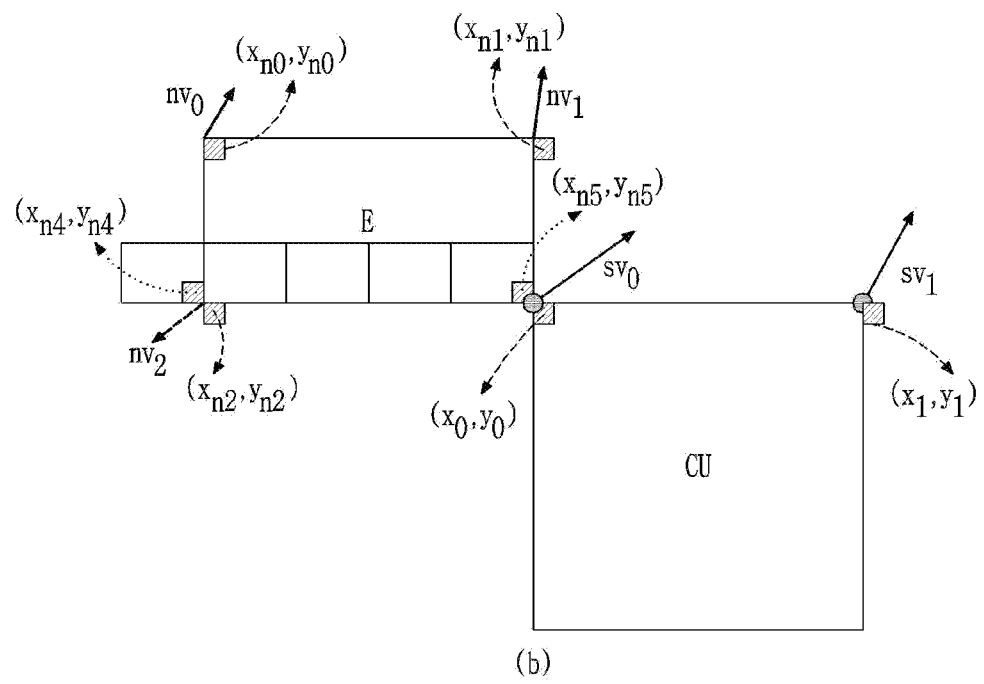
(b)

[FIG. 16]
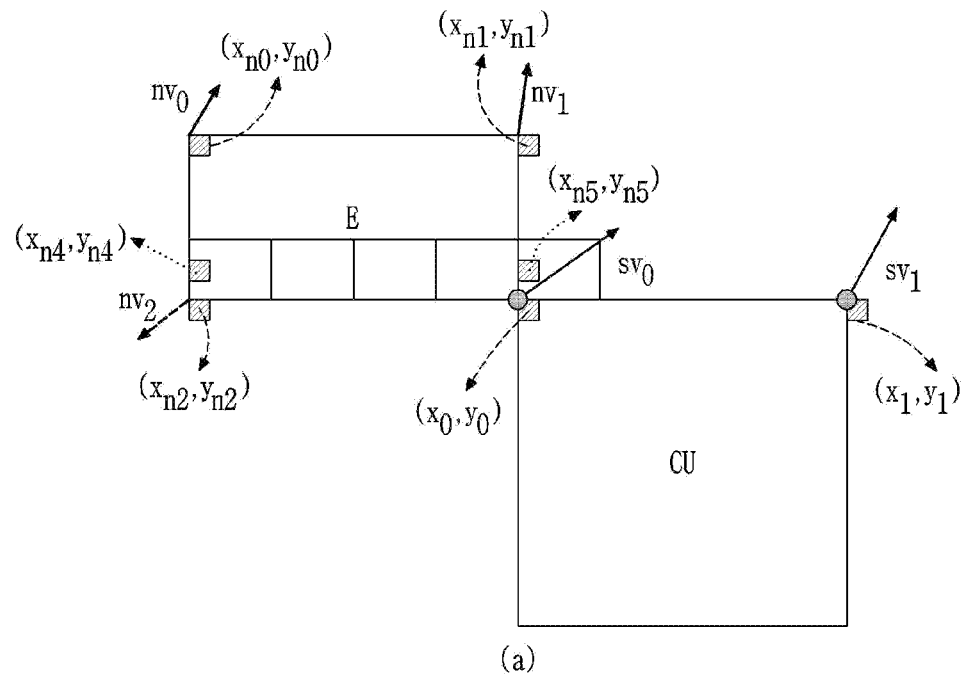
(a)
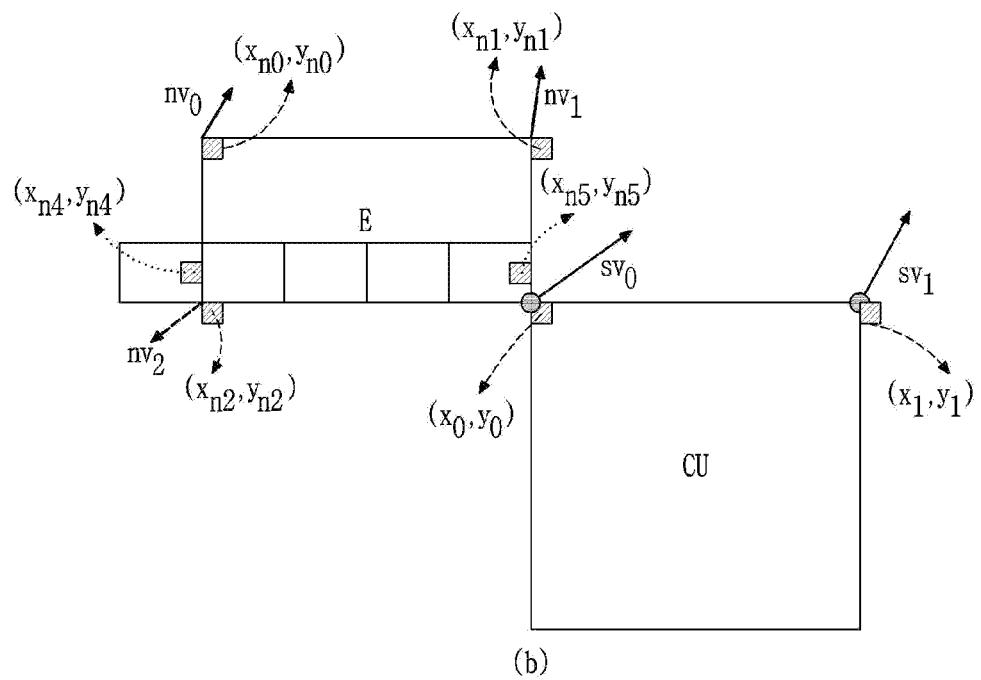
(b)

【FIG. 17】
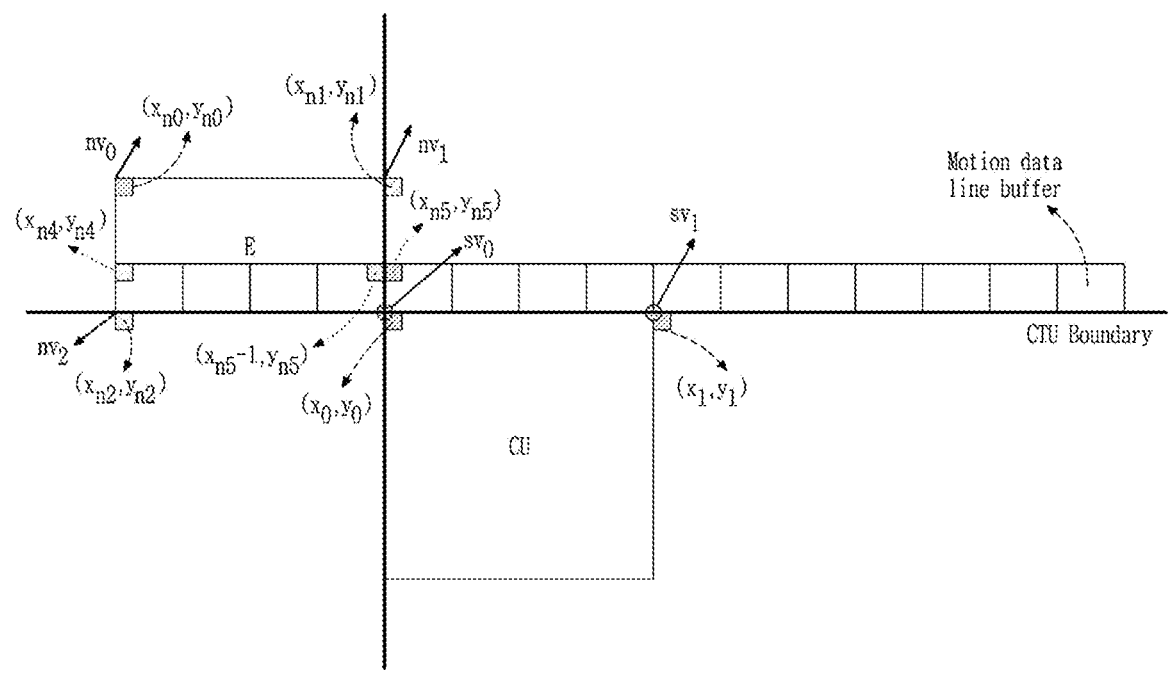

[FIG. 18]
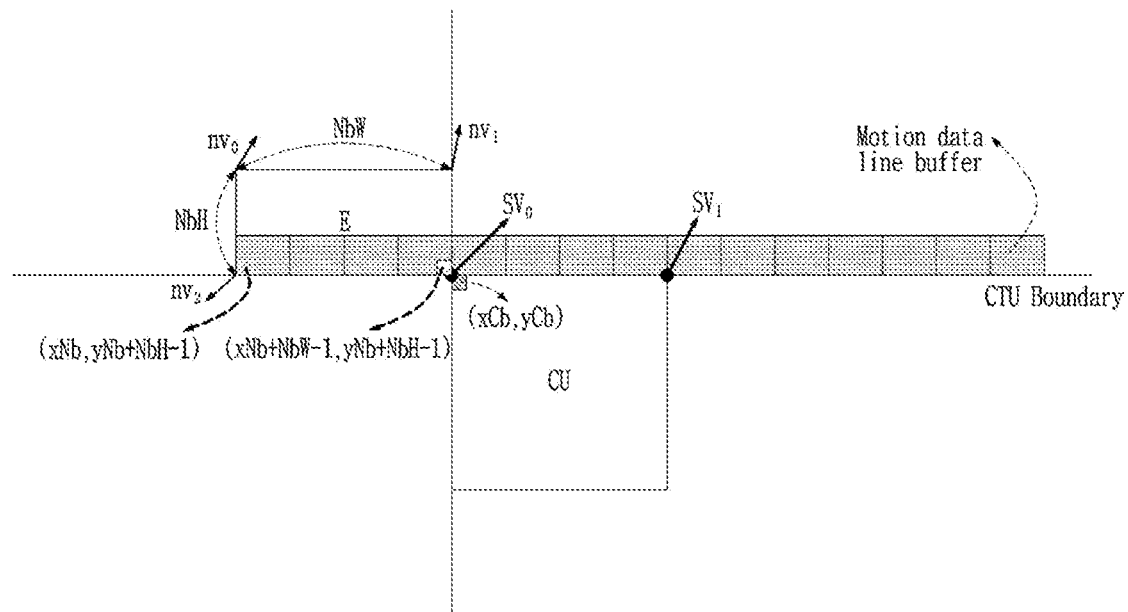
[FIG. 19]
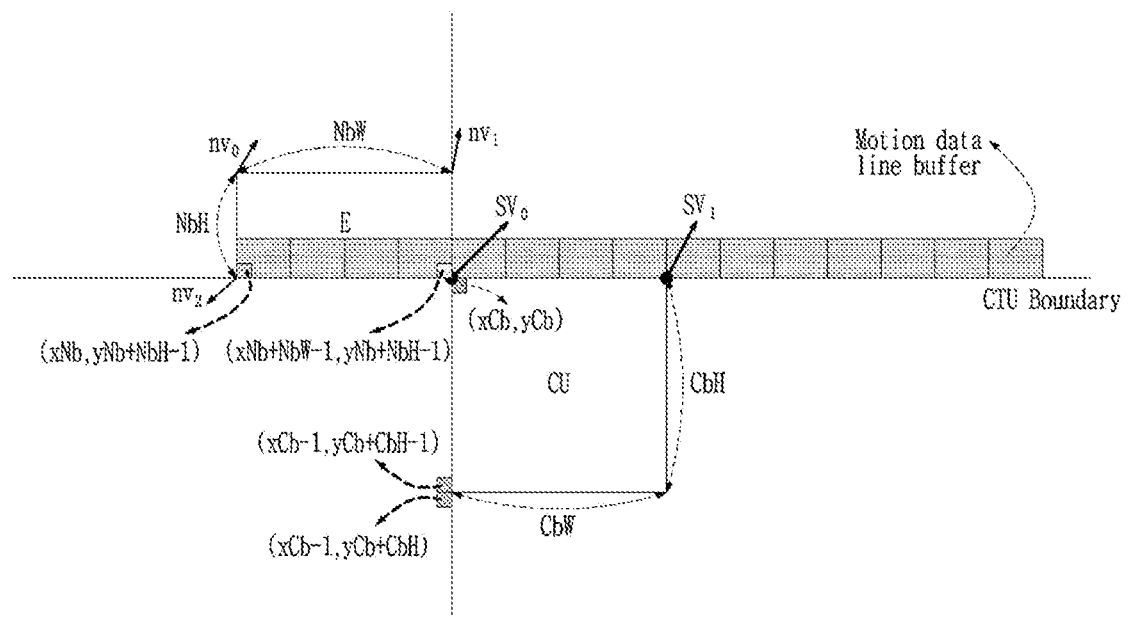

[FIG. 20]
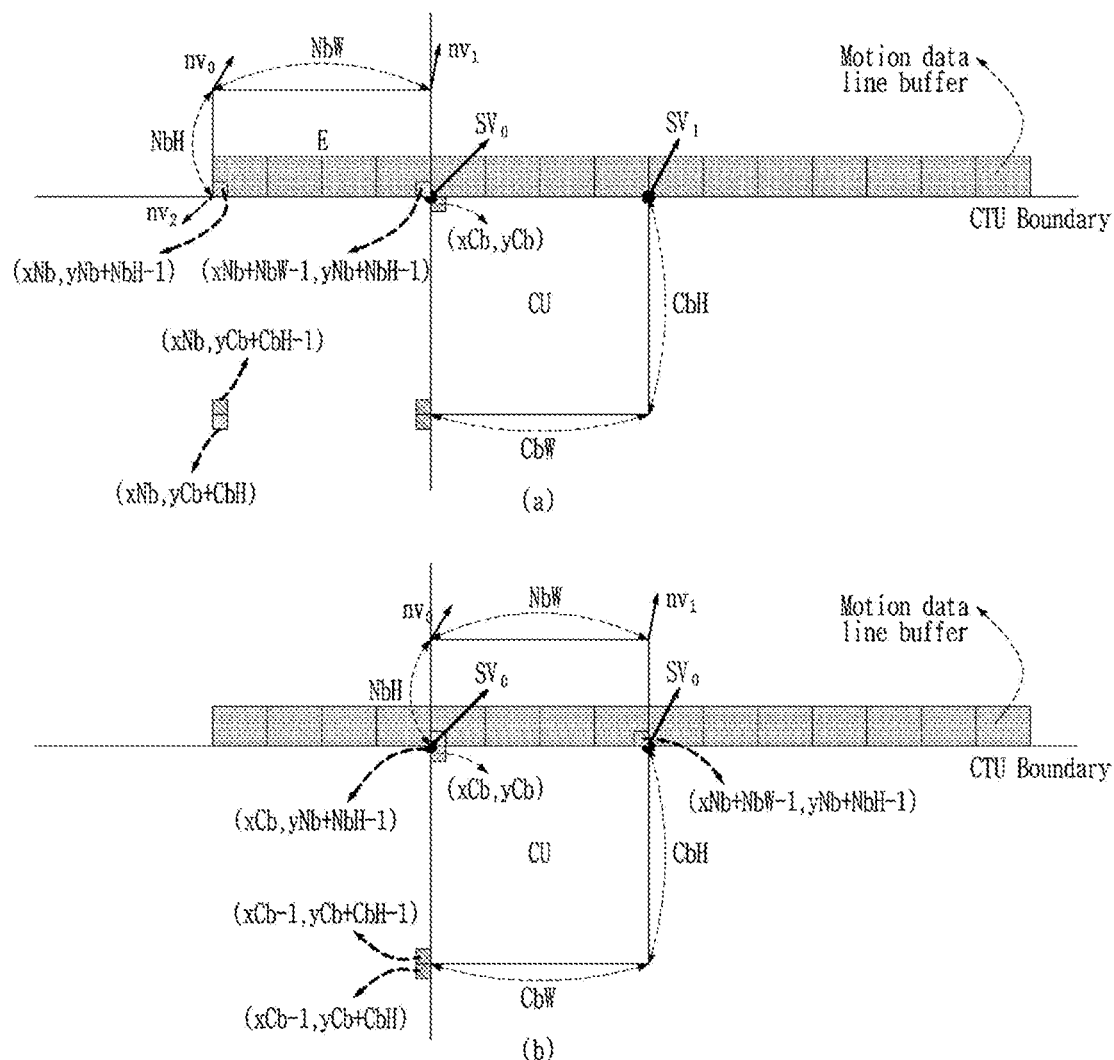

[FIG. 21]
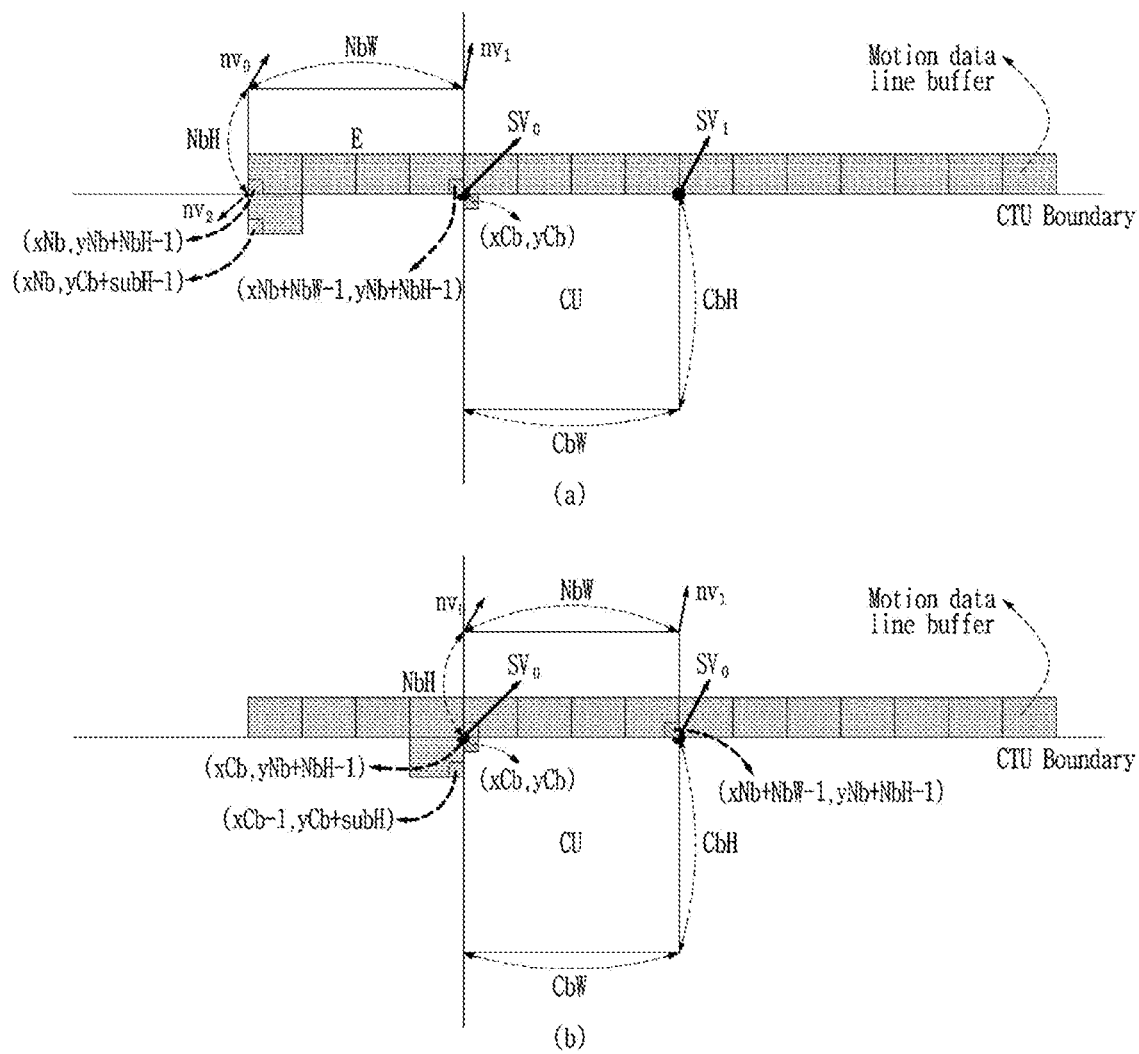

[FIG. 22]
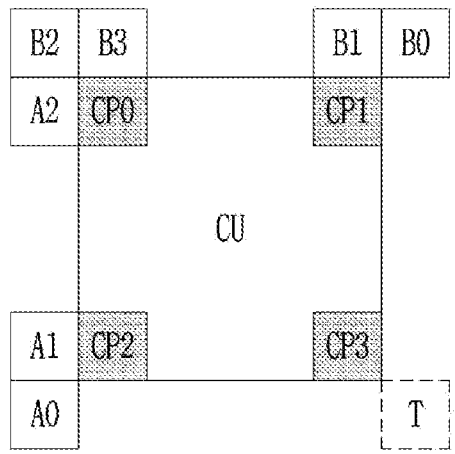
[FIG. 23]
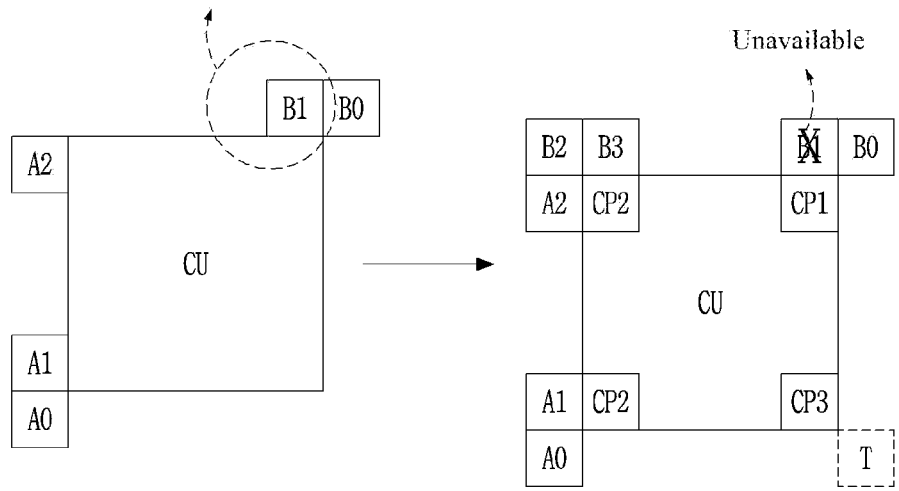

[FIG. 24]
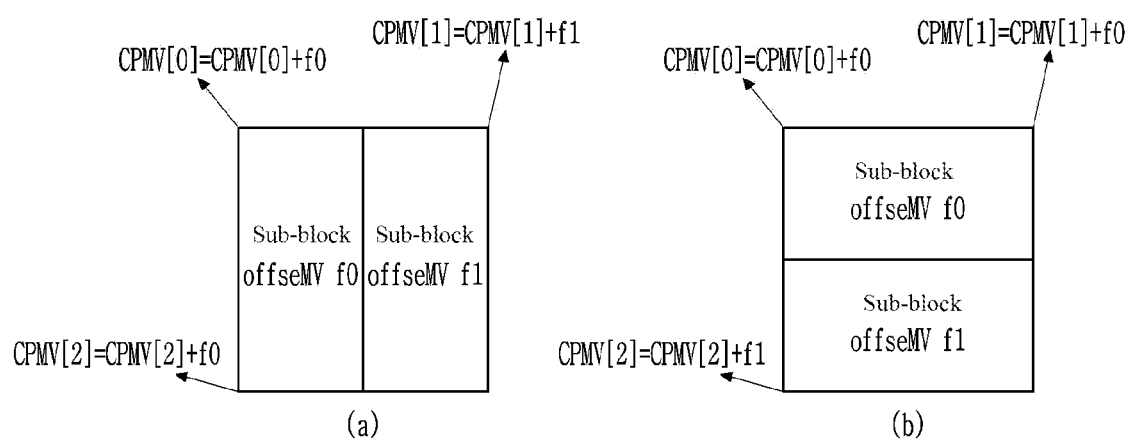

[FIG. 25]
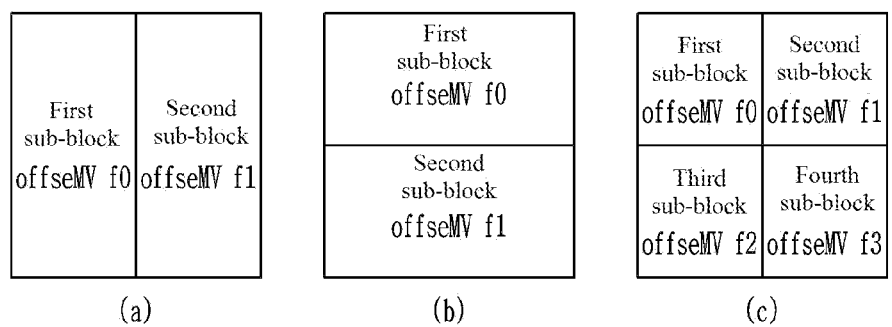
[FIG. 26]
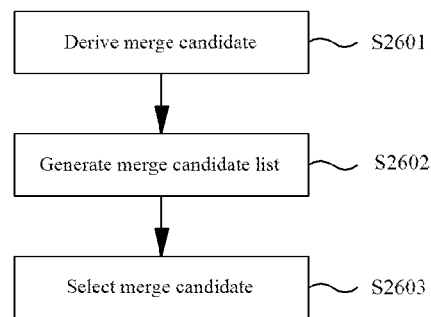

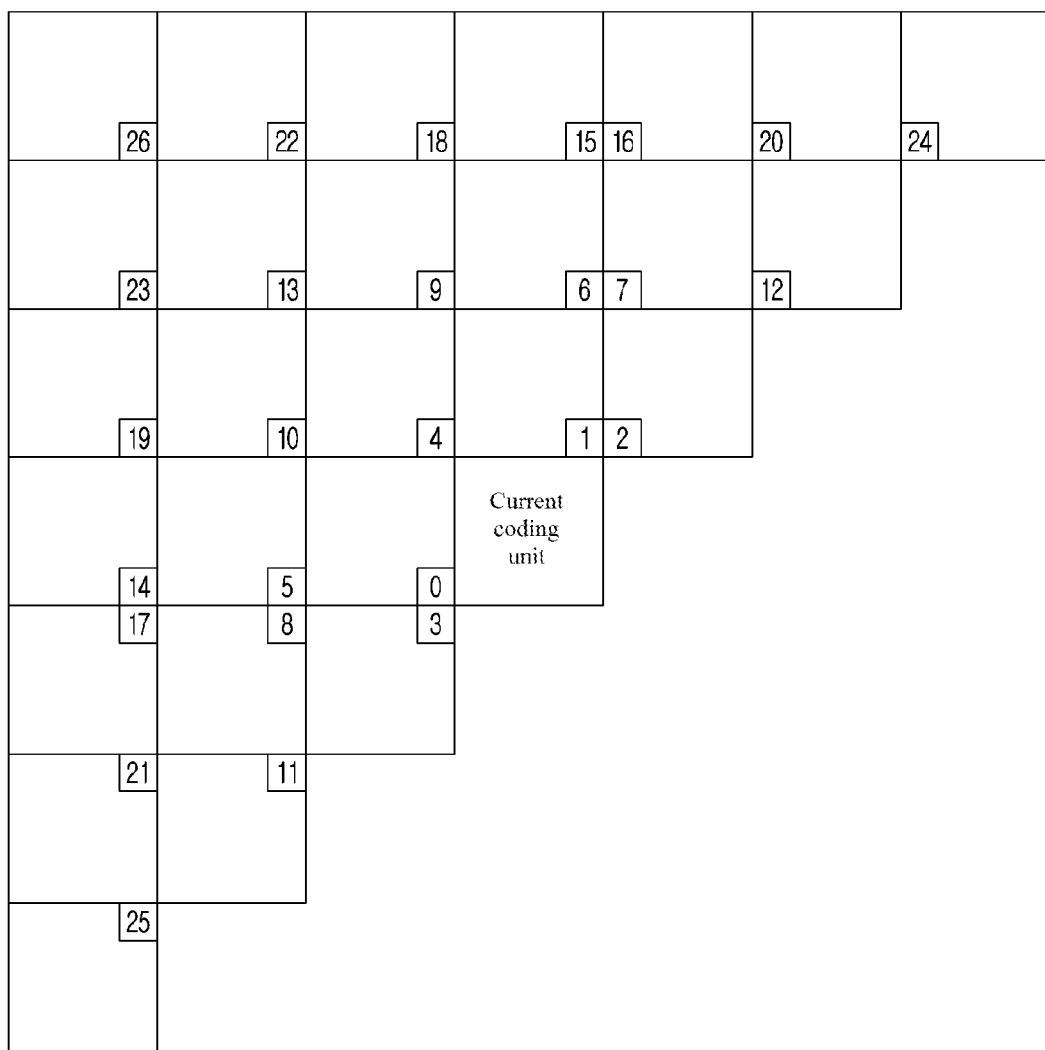
[FIG. 27]

[FIG. 28]
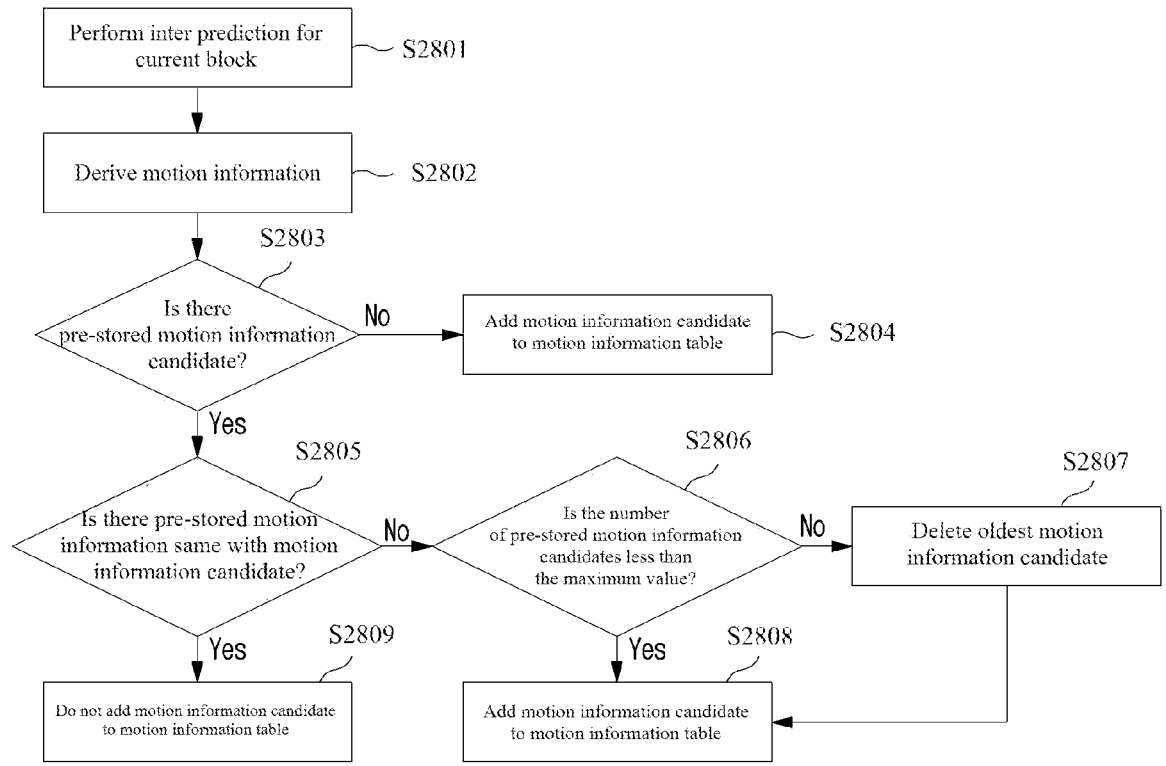
[FIG. 29]
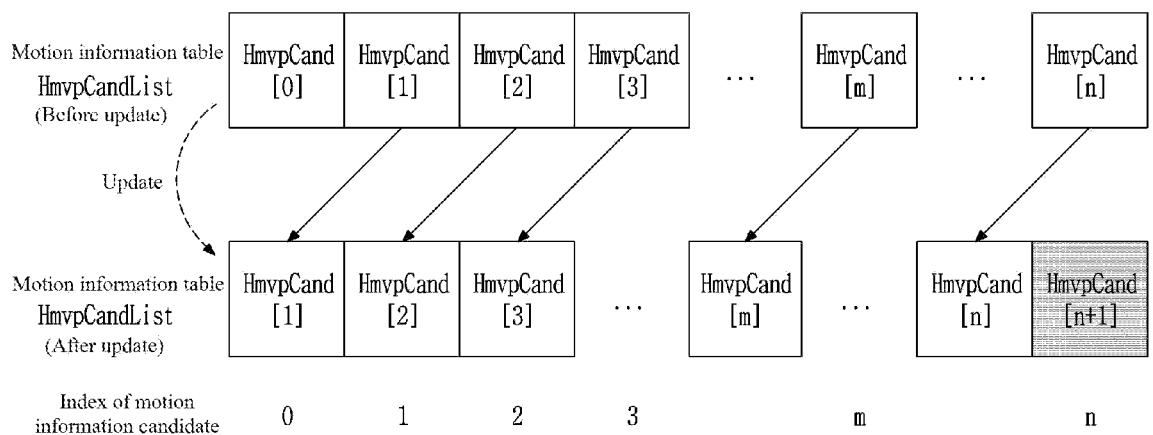

[FIG. 30]
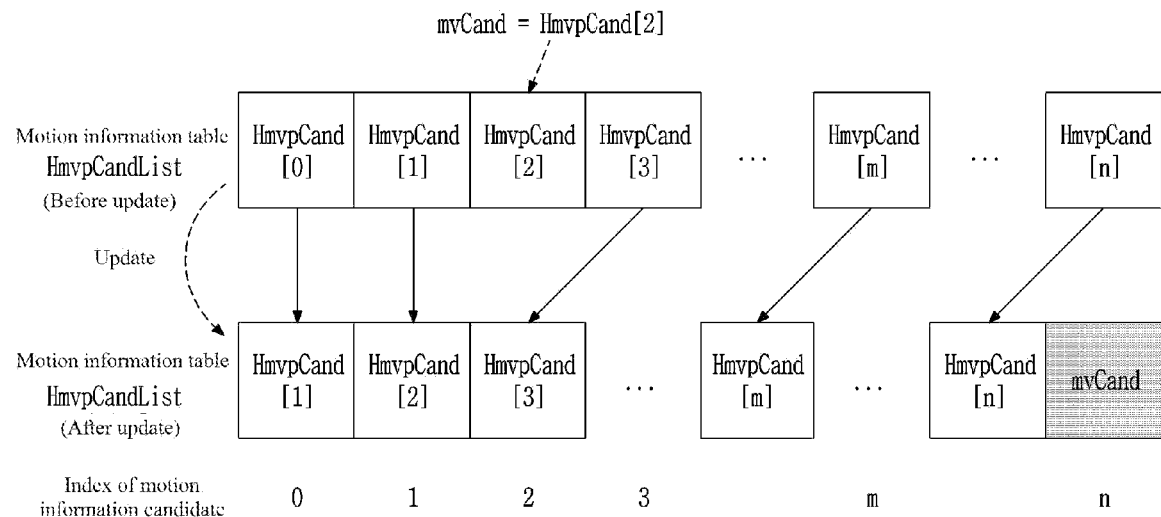
[FIG. 31]
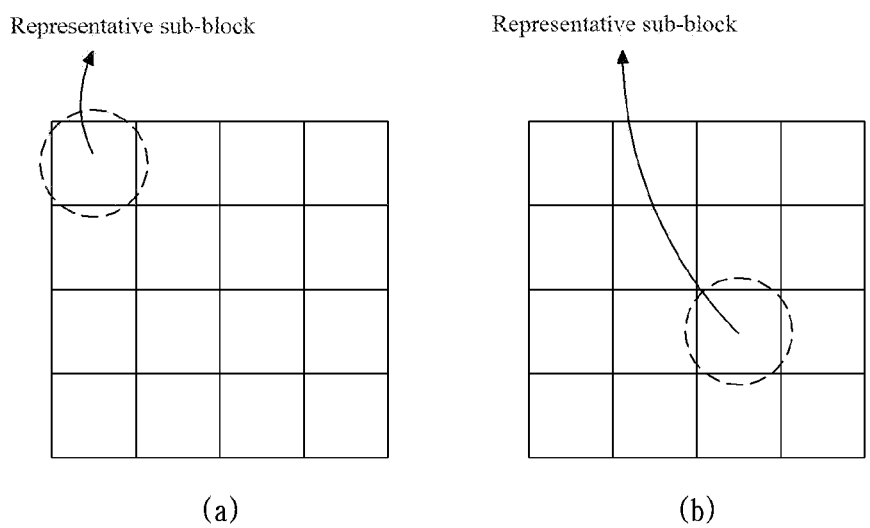
(a)        (b)

[FIG. 32]
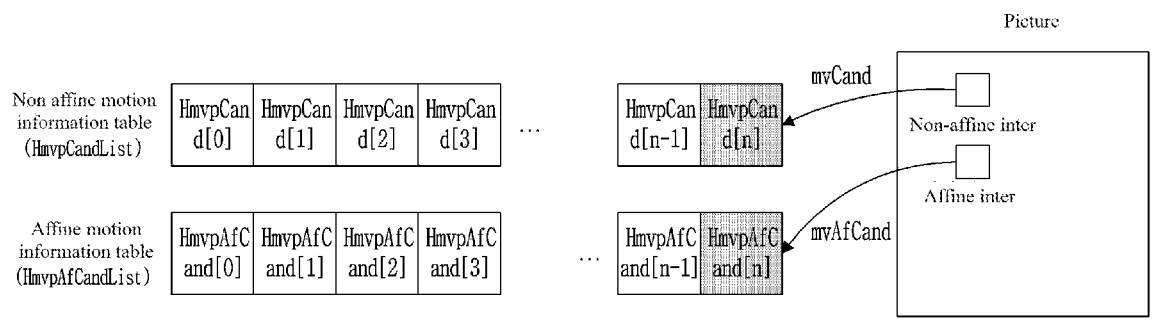
[FIG. 33]
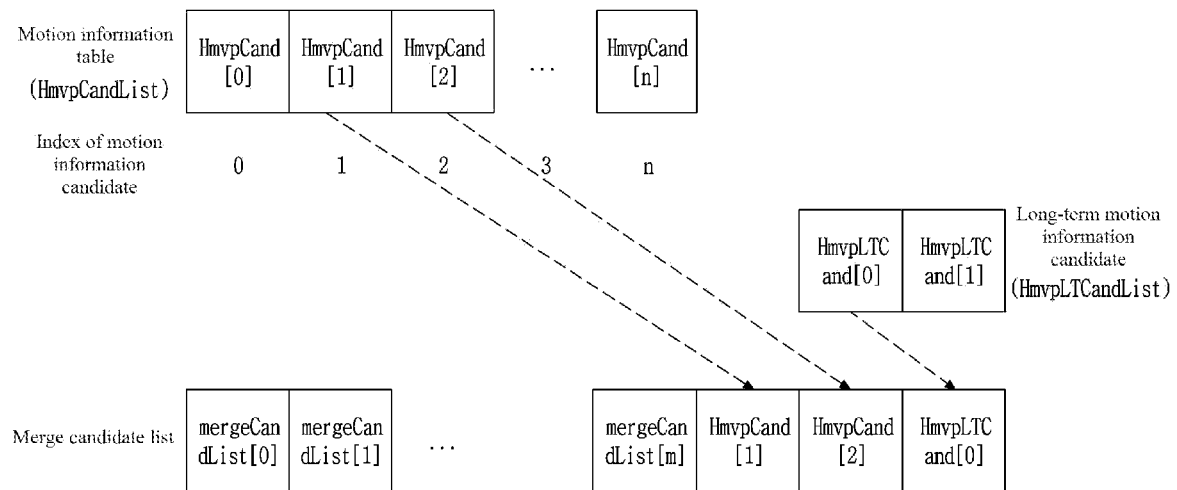

[FIG. 34]
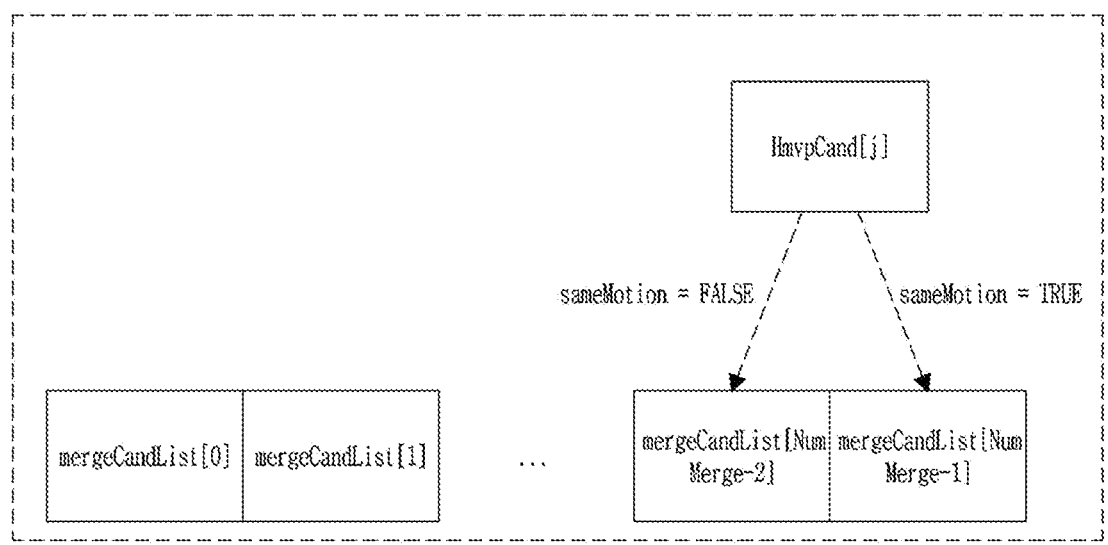

[FIG. 35]
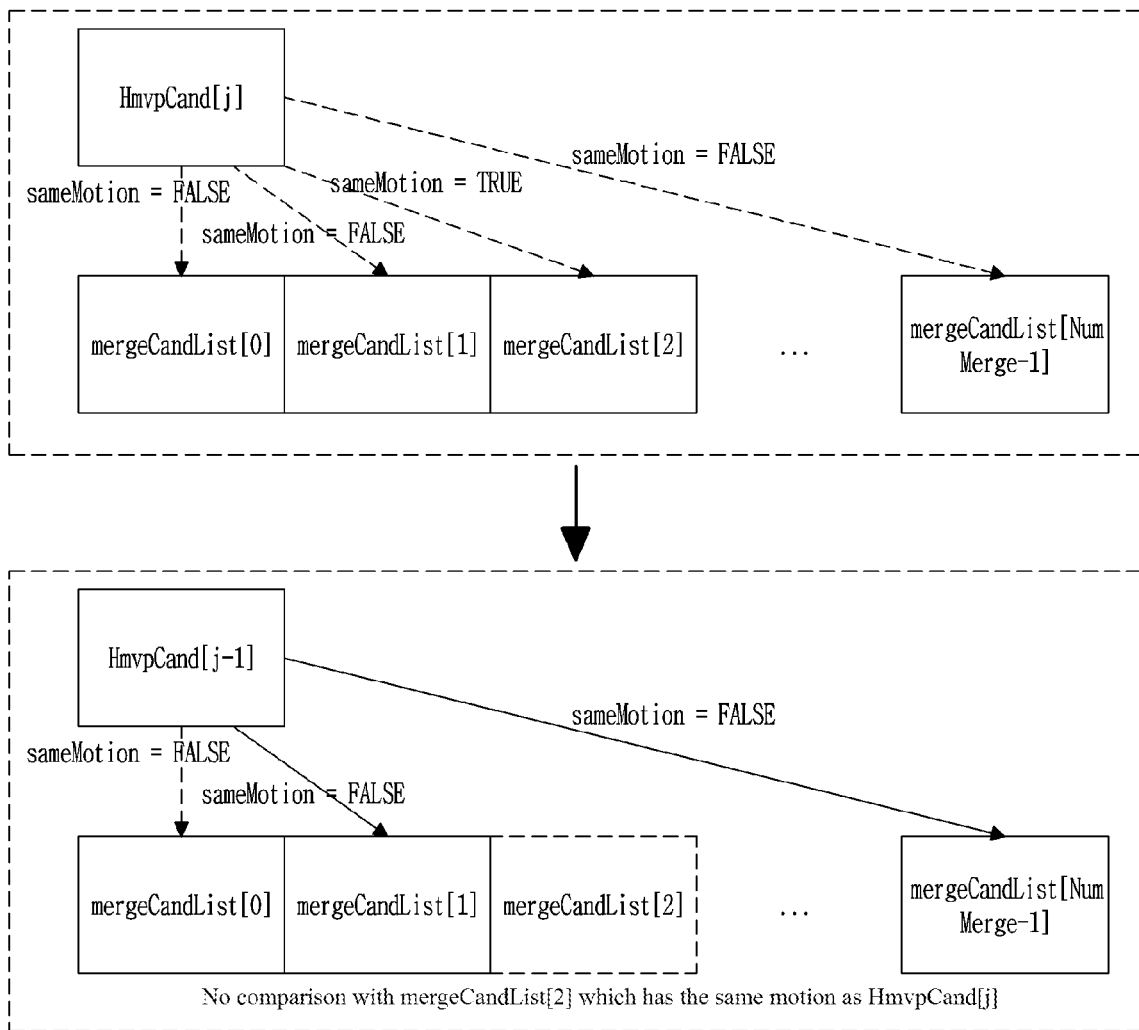

METHOD FOR ENCODING/DECODING IMAGE SIGNAL AND DEVICE THEREFOR

This application claims the benefit under 35 U.S.C. section 371, of PCT International Application No.: PCT/KR2019/018500, filed on Dec. 26, 2019, which claims foreign priority to Korean Patent Application No.: 10-2018-0169169, filed on Dec. 26, 2018, in the Korean Intellectual Property Office, the disclosures of which are hereby incorporated by reference in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical purpose

A purpose of the present disclosure is to provide an inter-prediction method using an affine model in encoding/decoding a video signal, and a device for performing the method.

A purpose of the present disclosure is to provide a method and a device for deriving an affine seed vector by using a translation motion vector of a sub-block in encoding/decoding a video signal.

A purpose of the present disclosure is to provide a method and a device for updating a prediction sample derived under an affine model by using an offset vector in encoding/decoding a video signal.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

A video signal decoding/encoding method according to the present disclosure may comprise generating an affine merge candidate list for a current block; specifying one of a plurality of affine merge candidates included in the affine merge candidate list; deriving affine seed vectors of the specified merge candidate; deriving a sub-block motion vector for a sub-block in the current block by using the affine seed vectors; deriving offset data for the sub-block; and generating a sub prediction block for the sub-block based on the affine vector and the offset data. In this connection, the sub-block may be a smaller region than the current block.

A video signal decoding/encoding method according to the present disclosure may further comprise decoding a flag from a bitstream for determining whether the offset data is used. In this connection, whether the offset data is used in generating the sub prediction block may be determined based on a value of the flag.

In a video signal decoding/encoding method according to the present disclosure, whether the offset data is used in generating the sub prediction block may be determined based on whether the affine seed vectors are mutually same.

In a video signal decoding/encoding method according to the present disclosure, a third prediction sample in the sub prediction block may be obtained based on a first prediction sample derived based on the affine vector and a second prediction sample derived based on the offset data.

In a video signal decoding/encoding method according to the present disclosure, the second prediction sample may be derived based on a horizontal directional gradient and a vertical directional gradient for the first prediction sample.

In a video signal decoding/encoding method according to the present disclosure, the offset data may be an array for offset vectors of each prediction sample in the sub-block.

It is to be understood that the foregoing summarized features are exemplary aspects of the following detailed description of the present disclosure without limiting the scope of the present disclosure.

Technical Effect

According to the present disclosure, an inter-prediction method by using an affine model may be provided to improve inter-prediction efficiency.

According to the present disclosure, a method deriving an affine seed vector by using the translation motion vector of a sub-block may be provided to improve inter-prediction efficiency.

According to the present disclosure, a method updating a prediction sample derived under an affine model by using an offset vector may be provided to improve inter-prediction efficiency.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a flow diagram of an inter prediction method according to an embodiment of the present disclosure.

FIG. 7 is a diagram illustrating the nonlinear motion of an object.

FIG. 8 is a flow diagram of an inter-prediction method based on an affine motion according to an embodiment of the present disclosure.

FIG. 9 is a diagram illustrating affine seed vectors for each affine motion model.

FIG. 10 is a diagram illustrating affine vectors of sub-blocks in a 4-parameter motion model.

FIG. 11 is a diagram showing a neighboring block which may be used to derive a merge candidate.

FIG. 12 is a diagram showing an example of deriving an affine seed vector of a current block based on an affine seed vector of an affine neighboring block.

FIG. 13 is a diagram showing an example in which a motion vector of a sub-block is set as an affine seed vector of an affine neighboring block.

FIGS. 14 to 16 are a diagram showing a position of an affine base sample.

FIG. 17 is a diagram showing an example in which a method of deriving a modified affine merge vector is applied.

FIG. 18 is a diagram showing an example of deriving an affine seed vector of an affine merge candidate based on motion vectors of sub-blocks included in a neighboring block.

FIG. 19 is a diagram showing an example of deriving affine seed vectors of an affine merge candidate based on motion vectors of sub-blocks positioned at a left of a current block.

FIG. 20 is a diagram showing an example of deriving an affine seed vector of an affine merge candidate based on motion information of a non-neighboring block or a neighboring block positioned at a left of a current block.

FIG. 21 is a diagram showing the position of a block for deriving an affine seed vector of an affine merge candidate.

FIG. 22 is a diagram to explain an example of deriving a combined affine merge candidate by combining motion vectors of a plurality of neighboring blocks.

FIG. 23 is a diagram showing an unavailable neighboring block.

FIG. 24 is a diagram showing an example in which a current block is partitioned into 2 sub-blocks.

FIG. 25 is a diagram showing an example in which an offset vector is derived per sub-block.

FIG. 26 is a flow diagram of a process deriving the motion information of a current block under a merge mode.

FIG. 27 is a diagram of illustrating candidate blocks used to derive a merge candidate.

FIG. 28 is a diagram to explain the update aspect of a motion information table.

FIG. 29 is a diagram showing the update aspect of a motion information table.

FIG. 30 is a diagram showing an example in which the index of a pre-saved motion information candidate is renewed.

FIG. 31 is a diagram showing the position of a representative sub-block.

FIG. 32 shows an example in which a motion information table is generated per inter-prediction mode.

FIG. 33 is a diagram showing an example in which a motion information candidate included in a long-term motion information table is added to a merge candidate list.

FIG. 34 is a diagram showing an example in which a redundance check is performed only for a part of merge candidates.

FIG. 35 is a diagram showing an example in which a redundance check with a specific merge candidate is omitted.

DETAILED DESCRIPTION OF THE DISCLOSURE

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying an offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (*a*)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT BT VER" of FIG. 4 (*b*) is a view showing a result of vertical directional binary-tree partitioning, and "SPLIT_BT_HOR" of FIG. 4 (*c*) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (*d*) is a view showing a result of vertical directional ternary-tree partitioning, and "SPLIT_TT_HOR" of FIG. 4 (*e*) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of a top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

FIG. 6 is a flow diagram of an inter-prediction method according to the embodiment of the present disclosure.

In reference to FIG. 6, an inter-prediction method includes determining an inter-prediction mode for a current block S601, obtaining motion information of the current block according to the determined inter-prediction mode S602, and performing motion compensation prediction for a current block on the basis of the obtained motion information S603.

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Hereinafter, an inter-prediction method using affine motion information is described in detail.

FIG. 7 is a diagram illustrating a non-linear motion of an object.

In a video, a non-linear motion of an object may occur. In an example, as in an example shown in FIG. 7, a non-linear motion of an object may occur such as camera zoom-in, zoom-out, rotation or affine transform, etc. For the nonlinear motion of the object, a translation motion vector may not effectively express the motion of the object. Accordingly, for a region in which the non-linear motion of the object is occur, encoding efficiency may be improved by using affine motion, instead of translation motion.

FIG. 8 is a flow diagram of an inter-prediction method based on an affine motion according to an embodiment of the present disclosure.

Whether an inter-prediction method based on an affine motion is applied to a current block may be determined based on information parsed from a bitstream. Concretely, based on at least one of a flag indicating whether an affine merge mode is applied to a current block or a flag indicating whether an affine motion vector prediction mode is applied to a current block, whether an inter-prediction method based on an affine motion is applied to a current block will be determined.

When an inter-prediction method based on an affine motion is applied to a current block, an affine motion model for the current block may be determined S801. An affine motion model may be determined as at least one of a 6-parameter affine motion model or a 4-parameter affine motion model. The 6-parameter affine motion model expresses an affine motion by using 6 parameters and the 4-parameter affine motion model expresses an affine motion by using 4 parameters.

Equation 1 expresses an affine motion by using 6 parameters. An affine motion represents translation motion for a predetermined region determined by affine seed vectors.

$$v_x = ax - by + e$$

$$v_y = cx + dy + j \quad \text{[Equation 1]}$$

In case of expressing an affine motion by using 6 parameters, complicated motion may be expressed, but encoding efficiency may be reduced as more bits are needed to encode each parameter. Accordingly, an affine motion may be expressed by using 4 parameters. Equation 2 expresses an affine motion by using 4 parameters.

$$v_x = ax - by + e$$

$$v_y = bx + ay + j \quad \text{[Equation 2]}$$

Information for determining an affine motion model of a current block may be encoded and signaled in a bitstream. In an example, the information may be a 1-bit flag, 'affine_type_flag'. If the value of the flag is 0, it may represent that a 4-parameter affine motion model is applied and if the value of the flag is 1, it may represent that a 6-parameter affine motion model is applied. The flag may be encoded in a unit of a slice, a tile, or a block (e.g. a coding block or a coding tree unit). When a flag is signaled at a slice level, an affine motion model determined at the slice level may be applied to all blocks belonging to the slice.

Alternatively, based on an affine inter-prediction mode of a current block, an affine motion model of the current block may be determined. In an example, when an affine merge mode is applied, an affine motion model of a current block may be determined as a 4-parameter motion model. On the other hand, when an affine motion vector prediction mode is applied, information for determining an affine motion model of a current block may be encoded and signaled in a bitstream. In an example, when an affine motion vector prediction mode is applied to a current block, an affine motion model of the current block may be determined based on a 1-bit flag, 'affine_type_flag'.

Next, affine seed vectors of a current block may be derived S802. When a 4-parameter affine motion model is selected, motion vectors at two control points for a current block may be derived. On the other hand, when a 6-parameter affine motion model is selected, motion vectors at three control points for a current block may be derived. A motion vector at a control point may be referred to as an affine seed vector. A control point may include at least one of a left-top corner, a right-top corner or a left-bottom corner of a current block.

FIG. 9 is a diagram illustrating affine seed vectors for each affine motion model.

In a 4-parameter affine motion model, affine seed vectors for two among a left-top corner, a right-top corner or a left-bottom corner may be derived. In an example, as in an example shown in FIG. 9 (a), when a 4-parameter affine motion model is selected, an affine vector may be derived by using an affine seed vector sv0 for a left-top corner of a current block (e.g. a left-top sample (x1, y1)) and an affine seed vector sv1 for a right-top corner of the current block (e.g. a right-top sample (x1, y1)). It is possible to use an affine seed vector for a left-bottom corner instead of the affine seed vector for the left-top corner or use an affine seed vector for a left-bottom corner instead of the affine seed vector for the right-top corner.

In a 6-parameter affine motion model, affine seed vectors for a left-top corner, a right-top corner and a left-bottom corner may be derived. In an example, as in an example shown in the FIG. 9 (b), when a 6-parameter affine motion model is selected, an affine vector may be derived by using an affine seed vector sv0 for a left-top corner of a current block (e.g. a left-top sample (x1, y1)), an affine seed vector sv1 for a right-top corner of the current block (e.g. a right-top sample (x1, y1)) and an affine seed vector sv2 for a left-top corner of the current block (e.g. a left-top sample (x2, y2)).

In an embodiment described later, under a 4-parameter affine motion model, affine seed vectors at a left-top control point and a right-top control point are referred to as a first affine seed vector and a second affine seed vector, respectively. In embodiments described later which use the first affine seed vector and the second affine seed vector, at least one of the first affine seed vector and the second affine seed vector may be replaced with an affine seed vector at a left-bottom control point (a third affine seed vector) or an affine seed vector at a right-bottom control point (a fourth affine seed vector).

In addition, under a 6-parameter affine motion model, affine seed vectors at a left-top control point, a right-top control point and a left-bottom control point are referred to as a first affine seed vector, a second affine seed vector and a third affine seed vector, respectively. In embodiments described later which use the first affine seed vector, the second affine seed vector and the third affine seed vector, at least one of the first affine seed vector, the second affine seed vector and the third affine seed vector may be replaced with an affine seed vector at a right-bottom control point (a fourth affine seed vector).

An affine vector may be derived per sub-block by using affine seed vectors S803. In this connection, the affine vector represents a translation motion vector derived based on the affine seed vectors. An affine vector of a sub-block can be referred to as an affine sub-block motion vector or a sub-block motion vector.

FIG. 10 is a diagram illustrating affine vectors of sub-blocks under a 4-parameter motion model.

An affine vector of a sub-block may be derived based on a position of a control point, a position of the sub-block and an affine seed vector. In an example, Equation 3 represents an example of deriving an affine sub-block motion vector.

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x}$$
$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$

[Equation 3]

In the Equation 3, (x, y) represents a position of a sub-block. In this connection, the position of the sub-block represents a position of a base sample included in the sub-block. The base sample may be a sample positioned at a left-top corner of the sub-block or a sample that at least one of an x-axis or y-axis coordinate is at a central position. (x0, y0) represents a position of a first control point and (sv0x, sv0y) represents a first affine seed vector. In addition, (x1, y1) represents a position of a second control point and (sv1x, sv1y) represents a second affine seed vector.

When the first control point and the second control point correspond to a left-top corner and a right-top corner of a current block, respectively, x1−x0 may be set as a value identical to a width of the current block.

After that, motion compensation prediction for each sub-block may be performed by using an affine vector of each sub-block S804. As a result of performing motion compensation prediction, a prediction block for each sub-block may be generated. The prediction blocks of sub-blocks may be set as a prediction block of a current block.

An affine seed vector of a current block may be derived based on an affine seed vector of a neighboring block neighboring the current block. When an inter-prediction mode of a current block is an affine merge mode, an affine seed vector of a merge candidate included in a merge candidate list may be determined as an affine seed vector of the current block. In addition, when the inter-prediction mode of the current block is the affine merge mode, motion information including at least one of the reference picture index, a specific directional prediction flag or a bidirectional weight of the current block may be also set the same as the merge candidate.

A merge candidate may be derived based on a neighboring block of a current block. The neighboring block may include at least one of a spatial neighboring block spatially adjacent to the current block and a temporal neighboring block included in a picture different from a current picture.

FIG. 11 is a diagram showing a neighboring block which may be used to derive a merge candidate.

A neighboring block of a current block may include at least one of a neighboring block adjacent to a left of the current block (A), a neighboring block neighboring a top of the current block (B), a neighboring block adjacent to a right-top corner of the current block (C), a neighboring block adjacent to a left-bottom corner of the current block (D) or a neighboring block adjacent to a left-top corner of the current block. When a coordinate of a left-top sample of the current block is (x0, y0), the left neighboring block A includes a sample at a position of (x0−1, y0+H−1) and the top neighboring block B includes a sample at a position of (x0+W−1, y0−1). In this connection, W and H represent a width and height of the current block, respectively. The right-top neighboring block C includes a sample at a position of (x0+W, y0−1) and the left-bottom neighboring block E includes a sample at a position of (x0−1, y0−1).

When a neighboring block is encoded by an affine inter-prediction mode, an affine seed vector of a merge candidate may be derived based on an affine seed vector of the corresponding neighboring block. Hereinafter, a neighboring block encoded by an affine inter-prediction mode is referred to as an affine neighboring block. In addition, under an affine merge mode, a merge candidate for deriving an affine seed vector of a current block is referred to as an affine merge candidate.

By searching neighboring blocks in a predefined scanning order, an affine merge candidate for a current block may be generated. The scanning order may be predefined in an encoder and a decoder. In an example, neighboring blocks may be searched in an order of A, B, C, D and E. And an affine merge candidate may be derived sequentially from searched affine neighboring blocks. Alternatively, the scanning order may be adaptively determined based on at least one of a size or shape or an affine motion model of a current block. In other words, the scanning order for blocks in which at least one of a size, a shape or an affine motion model differs may be different from each other.

Alternatively, by sequentially searching blocks positioned at the top of the current block, one affine merge candidate may be derived from an affine neighboring block which was found first and by sequentially searching blocks positioned at the left of the current block, one affine merge candidate may be derived from an affine neighboring block which was found first. In this connection, neighboring blocks positioned at the top of the current block may include at least one of a neighboring block E, B or C, and blocks positioned at the left of the current block may include at least one of a block A or D. In this connection, it is also possible to classify a neighboring block E as a block positioned at the left of the current block.

It is not shown in the drawing, but an affine merge candidate may be derived from a temporal neighboring block of a current block. In this connection, the temporal neighboring block may include a block at the same position of or adjacent to the current block in a collocated picture. Concretely, if the temporal neighboring block of the current block is encoded by an affine inter-prediction mode, an affine merge candidate may be derived based on an affine seed vector of the temporal affine merge candidate.

A merge candidate list including affine merge candidates may be generated and affine seed vectors of one among merge candidates included in the merge candidate list may be determined as affine seed vectors of a current block. For it, index information identifying any one of affine merge candidates may be encoded and transmitted in a bitstream.

In another example, neighboring blocks are searched in the scanning order, and affine seed vectors of a current block may be derived from affine seed vectors of an affine neighboring block which is found first.

As above, under an affine merge mode, affine seed vectors of a current block may be derived by using affine seed vectors of a neighboring block.

When the inter-prediction mode of a current block is an affine motion vector prediction mode, an affine seed vector of an affine motion vector prediction candidate included in a motion vector prediction candidate list may be determined as an affine seed vector prediction value of the current block. By adding an affine seed vector difference value to the affine seed vector prediction value, an affine seed vector of the current block may be derived.

An affine motion vector prediction candidate may be derived based on a neighboring block of a current block. Concretely, neighboring blocks positioned at the top of the current block may be searched in a predetermined scanning order and a first affine motion vector prediction candidate may be derived from an affine neighboring block which was found first. In addition, neighboring blocks positioned at the left of the current block may be searched in a predetermined scanning order and a second affine motion vector prediction candidate may be derived from an affine neighboring block which was found first.

Information for determining an affine seed vector difference value may be encoded and transmitted in a bitstream. The information may include size information representing a size of the affine seed vector difference value and sign information representing a sign of the affine seed vector difference value. An affine seed vector difference value for each control point may be set as the same value. Alternatively, an affine seed vector difference value may be set differently per control point.

As described above, an affine seed vector of an affine merge candidate or an affine motion vector prediction candidate may be derived from an affine seed vector of an affine neighboring block and an affine seed vector of a current block may be derived by using the derived affine merge candidate or affine motion vector prediction candidate. Alternatively, after searching affine neighboring blocks in a predetermined scanning order, an affine seed vector of a current block may be derived from an affine seed vector of an affine neighboring block which was found first.

Hereinafter, a method of deriving an affine seed vector of an affine merge candidate or an affine motion vector prediction candidate for a current block from the affine seed vector of an affine neighboring block will be described in detail. In embodiments described later, it may be understood that deriving an affine seed vector of a current block is corresponding to derive an affine seed vector of an affine merge candidate or derive an affine seed vector of an affine motion vector prediction candidate.

FIG. 12 is a diagram showing an example of deriving an affine seed vector of a current block based on an affine seed vector of an affine neighboring block.

If a first affine seed vector $n_{v0}$ for a left-top control point and a second affine seed vector $n_{v1}$ for a right-top control point are stored for an affine neighboring block, a third affine seed vector $n_{v2}$ for a left-bottom control point of the affine neighboring block may be derived based on the first affine seed vector and the second affine seed vector. Equation 4 represents an example deriving the third affine seed vector.

$$nv_{2x} = \frac{(nv_{1x} - nv_{0x})}{(x_{n1} - x_{n0})}(x_{n2} - x_{n0}) - \frac{(nv_{1y} - nv_{0y})}{(x_{n1} - x_{n0})}(y_{n2} - y_{n0}) + nv_{0x} \quad \text{[Equation 4]}$$

$$nv_{2y} = \frac{(nv_{1y} - nv_{0y})}{(x_{n1} - x_{n0})}(x_{n2} - x_{n0}) - \frac{(nv_{1x} - nv_{0x})}{(x_{n1} - x_{n0})}(y_{n2} - y_{n0}) + nv_{0y}$$

In the Equation 4, $(nv_{0x}, nv_{0y})$ represents the first affine seed vector $nv_0$, $(nv_{1x}, nv_{1y})$ represents the second affine seed vector $nv_1$ and $(nv_2)$, $nv_{2y}$ represents the third affine seed vector $nv_2$. In addition, $(x_{n0}, x_{n0})$ represents a position of the first control point, $(x_{n1}, x_{n1})$ represents a position of the second control point and $(x_{n2}, x_{n2})$ represents a position of the third control point.

After that, by using the first affine seed vector, the second affine seed vector and the third affine seed vector, an affine seed vector of a current block may be derived. Equation 5 represents an example of deriving a first affine seed vector v0 of a current block and Equation 6 represents an example of deriving a second affine seed vector v1 of a current block.

$$v_{0x} = \frac{(nv_{1x} - nv_{0x})}{(x_{n1} - x_{n0})}(x_0 - x_{n0}) - \frac{(nv_{2x} - nv_{0x})}{(y_{n2} - x_{n0})}(y_0 - y_{n0}) + nv_{0x} \quad \text{[Equation 5]}$$

$$v_{0y} = \frac{(nv_{1y} - nv_{0y})}{(x_{n1} - x_{n0})}(x_0 - x_{n0}) -$$

$$\frac{(nv_{2y} - nv_{0y})}{(y_{n2} - x_{n0})}(y_0 - y_{n0}) + nv_{0y}$$

$$v_{1x} = \frac{(nv_{1x} - nv_{0x})}{(x_{n1} - x_{n0})}(x_1 - x_{n0}) - \frac{(nv_{2x} - nv_{0x})}{(y_{n2} - x_{n0})}(y_1 - y_{n0}) + nv_{0x} \quad \text{[Equation 6]}$$

$$v_{1y} = \frac{(nv_{1y} - nv_{0y})}{(x_{n1} - x_{n0})}(x_1 - x_{n0}) -$$

$$\frac{(nv_{2y} - nv_{0y})}{(y_{n2} - x_{n0})}(y_1 - y_{n0}) + nv_{0y}$$

In Equation 5 and 6, $(v_{0x}, v_{0y})$ represents the first affine seed vector $sv_0$ of the current block and $(v_{1x}, v_{1y})$ represents the second affine seed vector $sv_1$ of the current block. In addition, $(x_0, y_0)$ represents a position of the first control point and $(x_1, y_1)$ represents a position of the second control point. In an example, the first control point represents a left-top corner of the current block and the second control point represents a right-top corner of the current block.

The above-mentioned example described that affine seed vectors of a current block are derived by using 3 affine seed vectors for an affine neighboring block. In another example, affine seed vectors of a current block may be derived by using only 2 of affine seed vectors of an affine neighboring block.

Alternatively, affine seed vectors of a current block may be derived by using a fourth affine seed vector for a right-bottom corner instead of a first affine seed vector of a left-top corner, a second affine seed vector of a right-top corner or a third affine seed vector of a left-bottom corner for an affine neighboring block.

In particular, when a top boundary of a current block adjoins a top boundary of a coding tree unit and an affine seed vector for a top control point (e.g. a left-top corner or a right-top corner) of an affine neighboring block neighboring the top of the current block (hereinafter referred to as a top affine neighboring block) is used, they should be stored in a memory in advance, so it may cause a problem to increase the number of line buffers. Accordingly, when the top boundary of the current block adjoins the top boundary of the coding tree unit, it may be set for a top affine neighboring block that an affine seed vector of a bottom control point is used instead of an affine seed vector of a top control point(e.g. a left-bottom corner or a right-bottom corner). In an example, an affine seed vectors of a current block may be derived by using a third affine seed vector for a left-bottom corner and a fourth affine seed vector for a right-bottom corner in a top affine neighboring block. In this connection, an affine seed vector for a bottom corner may be derived by copying an affine seed vector for a top corner or may be derived from affine seed vectors for top corners. In an example, the first affine seed vector, the second affine seed vector or the third affine seed vector may be used by being converted into/substituted with the fourth affine seed vector for the right-bottom corner.

Equation 7 and 8 represent an example of deriving a first affine seed vector and a second affine seed vector of a current block by using a third affine seed vector for a left-bottom control point and a fourth affine seed vector for a right-bottom control point in an affine neighboring block.

$$v_{0x} = \frac{(nv_{3x} - nv_{2x})}{(x_{n3} - x_{n2})}(x_0 - x_{n2}) - \frac{(nv_{3y} - nv_{2y})}{(x_{n3} - x_{n2})}(y_0 - y_{n2}) + nv_{2x}$$
$$v_{0y} = \frac{(nv_{3y} - nv_{2y})}{(x_{n3} - x_{n2})}(x_0 - x_{n2}) - $$
$$\frac{(nv_{3x} - nv_{2x})}{(x_{n3} - x_{n2})}(y_0 - y_{n2}) + nv_{2y}$$
[Equation 7]

$$v_{1x} = \frac{(nv_{3x} - nv_{2x})}{(x_{n3} - x_{n2})}(x_1 - x_{n2}) - \frac{(nv_{3y} - nv_{2y})}{(x_{n3} - x_{n2})}(y_1 - y_{n2}) + nv_{2x}$$
$$v_{1y} = \frac{(nv_{3y} - nv_{2y})}{(x_{n3} - x_{n2})}(x_1 - x_{n2}) - $$
$$\frac{(nv_{3x} - nv_{2x})}{(x_{n3} - x_{n2})}(y_1 - y_{n2}) + nv_{2y}$$
[Equation 8]

In Equation 7 and 8, $(x_{n2}, y_{n2})$ represents a coordinate for the left-bottom control point of the affine neighboring block and $(x_{n3}, y_{n3})$ represents a coordinate for the right-bottom control point of the affine neighboring block. $(x_0, y_0)$ represents a coordinate for the left-top control point of the current block and $(x_1, y_1)$ represents a coordinate for the right-top control point of the current block. $(nv_{2x}, nv_{2y})$ represents an affine seed vector (i.e. the third affine seed vector) for the left-bottom control point of the affine neighboring block and $(nv_{3x}, nv_{3y})$ represents an affine seed vector (i.e. the fourth affine seed vector) for the right-bottom control point of the affine neighboring block. $(v_{0x}, v_{0y})$ represents an affine seed vector (i.e. the first affine seed vector) for the left-top control point of the current block and $(v_{1x}, v_{1y})$ represents an affine seed vector (i.e. the second affine seed vector) for the right-top control point of the current block.

A division operation included in Equations 7 and 8 may be changed into a bit shift operation. The bit shift operation may be performed based on a value derived by a width between a left-bottom control point and a right-bottom control point (i.e. $(x_{n3}-x_{n2})$)

As in the above-mentioned example, affine seed vectors of a current block may be derived from affine seed vectors of an encoded/decoded affine neighboring block. For it, the affine seed vectors of the encoded/decoded affine neighboring block should be stored in a memory. But, there is a problem that as the affine seed vectors of the affine neighboring block are stored in a memory in addition to the translation motion vectors of sub-blocks included in the affine neighboring block (i.e. affine vectors), memory usage increases. To solve the above problem, an affine seed vector of a current block may be derived by using a motion vector of a sub-block adjacent to a control point of an affine neighboring block instead of an affine seed vector of the affine neighboring block. In other words, the affine seed vector of the current block may be derived by considering the motion vector of the sub-block adjacent to the control point of the affine neighboring block as the affine seed vector of the affine neighboring block. In this connection, the sub-block may be a block with a size/shape predefined in an encoder and a decoder, and may be a block has a base size/shape in which a motion vector is stored. In an example, a sub-block is a square block of 4×4 size. Alternatively, a motion vector for a specific sample position may be set as an affine seed vector of an affine neighboring block.

FIG. 13 is a diagram showing an example in which a motion vector of a sub-block is set as an affine seed vector of an affine neighboring block.

A motion vector of a sub-block adjacent to a control point may be set as an affine seed vector at the corresponding control point. In an example, as in an example shown in FIG. 13, a motion vector $(nv_4, nv_{4y})$ of a sub-block (a left-bottom sub-block) adjacent to a left-bottom corner of an affine neighboring block may be set as an affine seed vector $(nv_{2x}, nv_{2y})$ for the left-bottom control point and a motion vector $(nv_{5x}, nv_{5y})$ of a sub-block (a right-bottom sub-block) adjacent to a right-bottom corner may be set as an affine seed vector $(nv_{3x}, nv_{3y})$ for the control point of the right-bottom corner. In this connection, the left-bottom sub-block may mean a sub-block including a sample (e.g. a sample at a position of $(x_{n2}, y_{n2}-1)$) adjacent to the left-bottom control point $(x_{n2}, y_{n2})$ in the affine neighboring block and the right-bottom sub-block may mean a sub-block including a sample (e.g. a sample at a position of $(x_{n3}-1, y_{n3}-1)$) adjacent to the right-bottom control point $(x_{n3}, y_{n3})$ in the affine neighboring block. When the affine seed vectors of the current block are derived based on Equations 7 and 8, a third affine seed vector of the affine neighboring block may be replaced with the motion vector of the left-bottom sub-block and a fourth affine seed vector may be replaced with the motion vector of the right-bottom sub-block.

Hereinafter, in an embodiment described later, a sub-block used to substitute an affine seed vector of an affine neighboring block is referred to as an affine sub-block.

According to the embodiment of the present disclosure, an affine sub-block may be determined based on a sample at a specific position. In an example, a sub-block including a sample at a specific position may be set as an affine sub-block. Hereinafter, a sample at a specific position is referred to as an affine base sample. In addition, an affine base sample used to determine an affine sub-block at a left-bottom control point is referred to as a left-bottom base sample and an affine base sample used to determine an affine sub-block at a right-bottom control point is referred to as a right-bottom base sample.

A left-bottom base sample and a right-bottom base sample may be selected from samples included in an affine neighboring block. In an example, at least one of a left-top sample, a left-bottom sample, a right-top sample or a left-bottom sample of a left-bottom sub-block may be set as a left-bottom base sample and at least one of a left-top sample, a left-bottom sample, a right-top sample or a left-bottom sample of a right-bottom sub-block may be set as a right-bottom base sample. Accordingly, motion vectors of the left-bottom sub-block including the left-bottom base sample and the right-bottom sub-block including the right-bottom base sample may be set as affine seed vectors for a left-bottom control point and for a right-bottom point, respectively.

In another example, at least one of a left-bottom base sample or a right-bottom base sample may be set as a sample positioned outside an affine neighboring block. It will be described in detail in reference to FIGS. 14 to 16.

FIGS. 14 to 16 are a diagram showing a position of an affine base sample.

As in an example shown in FIG. 14 (a), for a left-bottom control point, a left-top sample of a left-bottom sub-block may be set as an affine base sample $(x_{n4}, y_{n4})$. Accordingly, the left-bottom sub-block including the affine base sample $(x_{n4}, y_{n4})$ may be set as an affine sub-block for the left-bottom control point.

For a right-bottom control point, a sample positioned at a right of a right-top sample of a right-bottom sub-block may be set as an affine base sample $(x_{n5}, y_{n5})$. Accordingly, a sub-block which is neighboring the right of the right-bottom sub-block and including the affine base sample $(x_{n5}, y_{n5})$ may be set as an affine sub-block for the right-bottom control point.

Alternatively, as in an example shown in FIG. 14 (b), for a left-bottom control point, a sample positioned at a left of a left-top sample of a left-bottom sub-block may be set as an affine base sample $(x_{n4}, y_{n4})$. Accordingly, a sub-block which is neighboring the left of the left-bottom sub-block and including the affine base sample $(x_{n4}, y_{n4})$ may be set as an affine sub-block for a left-bottom control point.

For a right-bottom control point, a right-top sample of a right-bottom sub-block may be set as an affine base sample $(x_{n5}, y_{n5})$. Accordingly, the right-bottom sub-block including the affine base sample $(x_{n5}, y_{n5})$ may be set as an affine sub-block for the right-bottom control point.

Alternatively, as in an example shown in FIG. 15 (a), for a left-bottom control point, a left-bottom sample of a left-bottom sub-block may be set as an affine base sample $(x_{n4}, y_{n4})$. Accordingly, the left-bottom sub-block including the affine base sample $(x_{n4}, y_{n4})$ may be set as an affine sub-block for the left-bottom control point.

For a right-bottom control point, a sample positioned at a right of a right-bottom sample of a right-bottom sub-block may be set as an affine base sample $(x_{n5}, y_{n5})$. Accordingly, a sub-block which is neighboring the right of the right-bottom sub-block and including the affine base sample $(x_{n5}, y_{n5})$ may be set as an affine sub-block for a right-bottom control point.

Alternatively, as in an example shown in FIG. 15 (b), for a left-bottom control point, a sample positioned at a left of a left-bottom sample of a left-bottom sub-block may be set as an affine base sample $(x_{n4}, y_{n4})$. Accordingly, a sub-block which is neighboring the left of the left-bottom sub-block and including the affine base sample $(x_{n4}, y_{n4})$ may be set as an affine sub-block for a left-bottom control point.

For a right-bottom control point, a right-bottom sample of a right-bottom sub-block may be set as an affine base sample $(x_{n5}, y_{n5})$. Accordingly, the right-bottom sub-block including the affine base sample $(x_{n5}, y_{n5})$ may be set as an affine sub-block for the right-bottom control point.

Alternatively, as in an example shown in FIG. 16 (a), for a left-bottom control point, a sample positioned between a left-top sample and a left-bottom sample of a left-bottom sub-block (e.g. a left-middle sample) may be set as an affine base sample $(x_{n4}, y_{n4})$. Accordingly, the left-bottom sub-block including the affine base sample $(x_{n4}, y_{n4})$ may be set as an affine sub-block for the left-bottom control point.

For a right-bottom control point, a sample positioned at a right of a sample positioned between a right-top sample and a right-bottom sample of a right-bottom sub-block (e.g. a right-middle sample) may be set as an affine base sample $(x_{n5}, y_{n5})$. Accordingly, a sub-block which is neighboring the right of the right-bottom sub-block and including the affine base sample $(x_{n5}, y_{n5})$ may be set as an affine sub-block for a right-bottom control point.

Alternatively, as in an example shown in FIG. 16 (b), for a left-bottom control point, a sample positioned at a left of a sample positioned between a left-top sample and a left-bottom sample of a left-bottom sub-block may be set as an affine base sample $(x_{n4}, y_{n4})$. Accordingly, a sub-block which is neighboring the left of the left-bottom sub-block and including the affine base sample $(x_{n4}, y_{n4})$ may be set as an affine sub-block for the left-bottom control point.

For a right-bottom control point, a sample positioned between a right-top sample and a right-bottom sample of a right-bottom sub-block may be set as an affine base sample $(x_{n5}, y_{n5})$. Accordingly, the right-bottom sub-block including the affine base sample $(x_{n5}, y_{n5})$ may be set as an affine sub-block for the right-bottom control point.

In case that affine seed vectors of a current block are derived base on Equations 7 and 8, a third affine seed vector of an affine neighboring block may be replaced with a motion vector of an affine sub-block for a left-bottom control point and a fourth affine seed vector may be replaced with a motion vector of an affine sub-block for a right-bottom control point. In addition, a position of the left-bottom control point may be replaced with a position of a left-bottom base sample and a position of the right-bottom control point may be replaced with a position of a right-bottom base sample.

Unlike description in FIGS. 14 to 16, a sub-block including a sample adjacent to an affine base sample may be set as an affine sub-block. Concretely, a sample positioned outside an affine neighboring sub-block may be set as an affine base sample, but a sub-block included in an affine neighboring block may be set as an affine sub-block. In an example, in an example shown in FIG. 14 (a), a sample positioned a right of a right-top sample of a right-bottom sub-block may be set as an affine base sample $(x_{n5}, y_{n5})$, but the right-bottom sub-block may be set as an affine sub-block for a right-bottom corner. Alternatively, in an example shown in FIG. 14 (b), a sample positioned a left of a left-top sample of a left-bottom sub-block may be set as an affine base sample $(x_{n4}, y_{n4})$, but the left-bottom sub-block may be set as an affine sub-block for a left-bottom corner.

A described embodiment may be equally applied to both FIGS. 15 and 16. In other words, in an example shown in FIG. 15 (a) or FIG. 16 (a), a sample positioned at a right of a right-bottom sample or a right-middle sample of a right-bottom sub-block may be set as an affine base sample $(x_{n5}, y_{n5})$, but the right-bottom sub-block may be set as an affine sub-block for a right-bottom corner. Alternatively, in an example shown in FIG. 15 (b) or FIG. 16 (b), a sample positioned at a left of a left-bottom sample or a left-middle sample of a left-bottom sub-block may be set as an affine base sample $(x_{n4}, y_{n4})$, but the left-bottom sub-block may be set as an affine sub-block for a left-bottom corner.

As in the above-mentioned example, an affine seed vector of an affine neighboring block may be derived by using a motion vector of an affine sub-block. For it, for an encoded/decoded block, a motion vector may be stored in a unit of a sub-block.

In another example, after storing the minimum number of affine seed vectors for an affine neighboring block instead of storing a motion vector in a unit of a sub-block, a motion vector of an affine sub-block may be derived by using the stored affine seed vectors.

Equations 9 and 10 represent examples of deriving a motion vector of an affine sub-block by using affine seed vectors of an affine neighboring block.

$$nv_{4x} = \frac{(nv_{1x} - nv_{0x})}{(x_{n1} - x_{n0})}(x_{n4} - x_{n0}) - $$
$$\frac{(nv_{1y} - nv_{0y})}{(x_{n1} - x_{n0})}(y_{n4} - y_{n0}) + nv_{0x}$$
$$nv_{4y} = \frac{(nv_{1y} - nv_{0y})}{(x_{n1} - x_{n0})}(x_{n4} - x_{n0}) - $$
$$\frac{(nv_{1x} - nv_{0x})}{(x_{n1} - x_{n0})}(y_{n4} - y_{n0}) + nv_{0y}$$

[Equation 9]

$$nv_{5x} = \frac{(nv_{1x} - nv_{0x})}{(x_{n1} - x_{n0})}(x_{n5} - x_{n0}) - $$
$$\frac{(nv_{1y} - nv_{0y})}{(x_{n1} - x_{n0})}(y_{n5} - y_{n0}) + nv_{0x}$$
$$nv_{5y} = \frac{(nv_{1y} - nv_{0y})}{(x_{n1} - x_{n0})}(x_{n5} - x_{n0}) - $$
$$\frac{(nv_{1x} - nv_{0x})}{(x_{n1} - x_{n0})}(y_{n5} - y_{n0}) + nv_{0y}$$

[Equation 10]

In Equations 9 and 10, $(nv_{4x}, nv_{4y})$ represents a motion vector of an affine sub-block for a left-bottom control point and $(nv_{5x}, nv_{5y})$ represents a motion vector of an affine sub-block for a right-bottom control point. Since a motion vector of an affine sub-block is set to be equal to an affine seed vector of a control point, $(nv_{4x}, nv_{4y})$ can be substituted with an affine seed vector $(nv_{2x}, ny_{2y})$ for the left-bottom control point or $(nv_5, ny_{5y})$ can be substituted with an affine seed vector $(nv_3, ny_{3y})$ for the right-bottom control point.

$(x_{n4}, y_{n4})$ represents a position of an affine base sample for a left-bottom sub-block. Alternatively, instead of that, a central position of the left-bottom sub-block or a position of a left-bottom control point may be used. $(x_{n5}, y_{n5})$ represents a position of an affine base sample for a right-bottom sub-block. Alternatively, instead of that, a central position of the right-bottom sub-block or a position of a right-bottom control point may be used.

Equations 9 and 10 may be applied when a current block does not adjoin a boundary of a coding tree unit. When a current block adjoins a top boundary of a coding tree unit, instead of using Equations 9 and 10, a translation motion vector of an affine sub-block determined based on a left-bottom base sample may be set as a third affine seed vector and a translation motion vector of an affine sub-block determined based on a right-bottom base sample may be set as a fourth affine seed vector.

In Equations 7 and 8, $(x_{n3}-x_{n2})$ represents a width between a left-bottom control point and a right-bottom control point. As described above, $x_{n3}$ may be substituted with a position of a right-bottom base sample $x_{n5}$, and $x_{n2}$ may be substituted with a position of a left-bottom base sample $x_{n4}$. Hereinafter, a value of $(x_{n3}-x_{n2})$ or a value obtained by substituting the position showed in the equation with the position of affine base samples (e.g. $(x_{n5}-x_{n4})$) is defined as a variable $W_{seed}$ and the variable is referred to as a sub seed vector width.

According to positions of affine base samples, a case may occur where a sub seed vector width is not a power series of (e.g. $2^n$). In an example, when a left-bottom sample of a left-bottom sub-block is set as a left-bottom base sample and a right-bottom sample of a right-bottom sub-block is set as a right-bottom base sample, the sub seed vector width is not a multiple of 2. Like this, when the sub seed vector width is not a power series of 2, the sub seed vector width may be converted to be a power series of 2. The conversion may be performed based on adding/subtracting an offset to/from the sub seed vector width or using the position of a sample neighboring the affine base sample instead of the position of the affine base sample. In an example, the converted sub seed vector width may be derived by adding 1 to a width between the left-bottom base sample and the right-bottom base sample. Alternatively, a width between a neighboring sample adjacent to a right of a right-bottom base sample and a left-bottom reference sample may be set as the converted sub seed vector width. After that, by applying the converted sub seed vector width to Equations 7 and 8, affine seed vectors of a current block may be derived.

The division operation included in Equations 7 and 8 may be changed into a bit shift operation. A bit shift operation may be performed based on a value derived by the converted sub seed vector width (i.e. a value expressed by a power series of 2).

When an affine base sample used to determine an affine sub-block does not included in an affine neighboring block, an affine seed vector of the affine neighboring block may be derived based on a sample adjacent to the affine base sample among samples included in the affine neighboring block. Concretely, in the affine neighboring block, a translation motion vector of a sub-block including the sample adjacent to the affine base sample (hereinafter, referred to as a neighboring base sample) may be set as the affine seed vector of the affine neighboring block. Like this, a method deriving an affine seed vector by using a neighboring base sample may be defined as a method deriving a transformed affine merge vector.

FIG. 17 is a diagram showing an example in which a method deriving a transformed affine merge vector is applied.

When the right-bottom base sample $(x_{n5}, y_{n5})$ of an affine neighboring block E does not included in an affine neighboring block, an affine seed vector may be derived based on a sample $(x_{n5}-1, y_{n5})$ adjacent to a left of a right-bottom base sample among samples included in an affine neighboring block. Concretely, a translation motion vector of a sub-block including the neighboring base sample $(x_{n5}-1, y_{n5})$ may be set as the affine seed vector of the right-bottom control point.

An example shown in FIG. 17 showed that a sample neighboring a right of a right-top sample of a right-bottom sub-block is a right-bottom base sample. When a sample neighboring the right of a right-bottom sample of the right-bottom sub-block or the right of a right-middle sample of the right-bottom sub-block is set as a right-bottom base sample, an affine seed vector may be derived based on a sample adjacent to a left of the neighboring base sample.

In addition, when a left-bottom base sample does not included in an affine neighboring block, an affine seed vector may be derived based on a sample adjacent to a right of the left-bottom base sample according to the described embodiment.

A sub seed vector width may be set as a power series of 2 by setting a position of an affine base sample to be different from a sub-block for deriving an affine seed vector.

Alternatively, affine seed vectors may be derived by using a motion vector of a left-bottom sub-block and a right-bottom sub-block, but based on a width of a neighboring block.

FIG. 18 is a diagram showing an example in which an affine seed vector of an affine merge candidate is derived based on motion vectors of sub-blocks included in a neighboring block.

When a top boundary of a current block adjoins a boundary of a coding tree unit, an affine seed vector of an affine merge candidate may be derived based on motion vectors of a left-bottom sub-block and a right-bottom sub-block in a top neighboring block positioned at a top of the current block. When it is assumed a position of a left-top sample of the top neighboring block is (xNb, yNb) and a width and height of the top neighboring block is NbW and NbH, respectively, the left-bottom sub-block may include a sample at a position of (xNb, yNb+yNbH−1) and the right-bottom sub-block may include a sample at a position of (xNb+NbW−1, yNb+NbH−1).

Affine seed vectors of an affine merge candidate may be derived based on a width of a neighboring block and a difference of a coordinate between the neighboring block and a current block. In an example, affine seed vectors of an affine merge candidate may be derived based on the following Equations 11 to 13.

$$v_{0x} = V_{LBx} << 7 + ((V_{RBx} - V_{LBx}) << (7 - \log_2(NbW))) * (xCb - xNb)$$

$$v_{0y} = V_{LBy} << 7 + ((V_{RBy} - V_{LBy}) << (7 - \log_2(NbW))) * (xCb - xNb)$$ [Equation 11]

$$v_{1x} = V_{LBx} << 7 + ((V_{RBx} - V_{LBx}) << (7 - \log_2(NbW))) * (xCb + xCbW - xNb)$$

$$v_{1y} = V_{LBy} << 7 + ((V_{RBy} - V_{LBy}) << (7 - \log_2(NbW))) * (xCb + xCbW - xNb)$$ [Equation 12]

$$v_{2x} = V_{LBx} << 7 + ((V_{RBx} - V_{LBx}) << (7 - \log_2(NbW))) * (xCb + xCbW - xNb) + ((V_{LBy} - V_{RBy}) << (7 - \log_2(NbW))) * xCbH$$

$$v_{2y} = V_{LBy} << 7 + ((V_{RBy} - V_{LBy}) << (7 - \log_2(NbW))) * (xCb + xCbW - xNb) + ((V_{LBx} - V_{RBx}) << (7 - \log_2(NbW))) * xCbH$$ [Equation 13]

In the above Equations 11 to 13, $(v_{0x}, v_{0y})$ represents a first affine seed vector, $(v_{1x}, v_{1y})$ represents a second affine seed vector and $(v_{2x}, v_{2y})$ represents a third affine seed vector. $V_{LBx}$ represents a horizontal component motion vector of a left-bottom sub-block and $V_{LBy}$ represents a vertical component motion vector of a left-bottom sub-block. $V_{RBx}$ represents a horizontal component motion vector of a right-bottom sub-block and $V_{RBy}$ represents a vertical component motion vector of a right-bottom sub-block. NbW represents a width of a neighboring block and xCbW and xCbH represent a width and height of a current block, respectively. xCb represents an x-coordinate of a left-top sample of the current block and xNb represents an x-coordinate of a left-top sample of the neighboring block.

An affine merge candidate may be generated by combining affine seed vectors derived from a first neighboring block and the motion vector of a second neighboring block. In an example, in an example shown in FIG. 18, a third affine seed vector of an affine merge candidate may be derived based on a motion vector of a sub-block positioned at a left of a current block, instead of deriving the third affine seed vector of the affine merge candidate based on motion vectors of a left-bottom sub-block and a right-bottom sub-block.

FIG. 19 is a diagram showing an example in which affine seed vectors of an affine merge candidate are derived based on motion vectors of sub-blocks positioned at a left of a current block.

Affine seed vectors of an affine merge candidate may be derived based on motion vectors of a left-bottom sub-block and a right-bottom sub-block included in a top neighboring block positioned at a top of a current block. Concretely, a first affine seed vector and a second affine seed vector of the affine merge candidate may be derived based on motion vectors of the left-bottom sub-block and the right-bottom sub-block. In an example, based on Equations 11 and 12, the first affine seed vector and the second affine seed vector of the affine merge candidate may be derived.

A third affine seed vector of the affine merge candidate may be derived based on a motion vector of a neighboring block positioned at a left of the current block. In an example, a motion vector of a neighboring block adjacent to the left of the current block or a motion vector of a neighboring block adjacent to the left-bottom corner of the current block may be set as the third affine seed vector. The neighboring block adjacent to the left of the current block may include a sample at a position of (xCb−1, yCb+CbH−1) and the neighboring block adjacent to the left-bottom of the current block may include a sample at a position of (xCb−1, yCb+CbH). Equations 14 and 15 represent an example in which the motion vector of the neighboring block positioned at the left of the current block is set as the third affine seed vector.

$$v_{2x} = V_{Leftx}$$

$$v_{2y} = V_{Lefty}$$ [Equation 14]

$$v_{2x} = V_{LBx}$$

$$v_{2y} = V_{LBy}$$ [Equation 15]

In Equation 14, $V_{Leftx}$ represents a horizontal directional motion vector of the neighboring block adjacent to the left of the current block and $V_{Lefty}$ represents the vertical directional motion vector of the neighboring block adjacent to the left of the current block. In Equation 15, $V_{LBx}$ represents the horizontal directional motion vector of the neighboring block adjacent to the left-bottom corner of the current block and $V_{LBy}$ represents the vertical directional motion vector of the neighboring block adjacent to the left-bottom corner of the current block.

Only when it is impossible to use the motion vector of the neighboring block adjacent to the left of the current block, a third affine seed vector may be derived by using the motion vector of the neighboring block adjacent to the left-bottom corner of the current block.

According to whether a motion vector of a neighboring block positioned at a left of a current block is used or not, a method deriving a third affine seed vector of an affine merge candidate may be set differently. In an example, when it is possible to use the motion vector of the neighboring block positioned at the left of the current block (e.g. a sub-block adjacent to the left of the current block or a sub-block adjacent to the left-bottom corner of the current block), the third affine seed vector may be derived by using Equations 14 or 15. On the other hand, when it is impossible to use the motion vector of the neighboring block positioned at the left of the current block, the third affine seed vector may be derived by using Equation 13.

It is also possible that a third affine seed vector may be derived based on a motion vector of a non-neighboring block in which a base sample is not adjacent to a current block. To derive the third affine seed vector, whether to use a motion vector of a neighboring block in which a base sample is adjacent to the current block or whether to use a motion vector of a non-neighboring block in which a base sample is not adjacent to the current block may be determined based on a position of a top neighboring block used to derive an affine merge candidate.

FIG. 20 is a diagram showing an example of deriving an affine seed vector of an affine merge candidate based on motion information of a non-neighboring block or a neighboring block positioned at a left of a current block.

By comparing a position of a left-top sample of a top neighboring block used to derive an affine merge candidate with that of a left-top sample of a current block, a position of a block for deriving a third affine seed vector may be determined. In an example, as in an example shown in FIG. 20 (a), when an x-coordinate(xNb) of a left-top sample of a top neighboring block is less than an x-coordinate(xCb) of a left-top sample of a current block, a third affine seed vector may be derived based on a motion vector of a non-neighboring block non-adjacent to the left of the current block. Concretely, the third affine seed vector may be derived based on a motion vector of a left non-neighboring block including a sample (xNb, yCb+CbH−1) with the same x-coordinate as a left-top sample of a top neighboring block or a left-bottom non-neighboring block including a sample at a position of (xNb, yCb+CbH). Equations 16 and 17 are diagrams showing examples of deriving a third affine seed vector based on a motion vector of a non-neighboring block.

$$v_{2x}=V_{left2x}$$

$$v_{2y}=V_{left2y} \quad \text{[Equation 16]}$$

$$v_{2x}=V_{LB2x}$$

$$v_{2y}=V_{LB2y} \quad \text{[Equation 17]}$$

In Equation 16, $V_{Left2x}$ represents a horizontal directional motion vector of a left non-neighboring block and $V_{Left2y}$ represents a vertical directional motion vector of a left non-neighboring block. In Equation 17, $V_{LB2X}$ represents a horizontal directional motion vector of a left-bottom non-neighboring block and $V_{LB2Y}$ represents a vertical directional motion vector of a left-bottom non-neighboring block.

Only when it is impossible to use a motion vector of a left non-neighboring block, the third affine seed vector may be derived by using a motion vector of a left-bottom non-neighboring block.

As in an example shown in FIG. 20 (b), when an x-coordinate(xNb) of a left-top sample of a top neighboring block is equal to or greater than an x-coordinate(xCb) of a left-top sample of a current block, a third affine seed vector may be derived based on a motion vector of a neighboring block adjacent to the left or the left-bottom corner of the current block. Concretely, the third affine seed vector may be derived based on a motion vector of a left neighboring block including a sample (xCb, yCb+CbH−1) adjacent to the left of the current block or a left-bottom neighboring block including a sample at a position of (xCb, yCb+CbH) adjacent to the left-bottom corner of the current block.

A position of a base sample for a left neighboring block or a left non-neighboring block may be set differently from that shown in FIGS. 18 to 20. In an example, a block including a sample (xCb−1, yCb+subH−1) adjacent to a current block may be set as a left neighboring block and a block including a sample (xNb−1, yCb+subH−1) non-adjacent to the current block may be set as a left non-neighboring block. In this connection, subH represents the minimum height of a block where motion information is stored and it may be a natural number such as 2, 4, or 8.

FIG. 21 is a diagram showing a position of a block for deriving an affine seed vector of an affine merge candidate.

In an example, as in an example shown in FIG. 21 (a), when an x-coordinate(xNb) of a left-top sample of a top neighboring block is less than an x-coordinate(xCb) of a left-top sample of a current block, a third affine seed vector may be derived based on a motion vector of a non-neighboring block non-adjacent to the left of the current block. Concretely, the third affine seed vector may be derived based on a motion vector of a left non-neighboring block including a sample (xNb, yCb+subH−1) having the same x-coordinate as the left-top sample of the top neighboring block and far apart from the left-bottom sample of the top neighboring block by a predetermined distance (e.g. subH). Equation 18 is a diagram showing an example of deriving the third affine seed vector based on the motion vector of the non-neighboring block.

$$v_{2x}=V_{LeftT2x}$$

$$v_{2y}=V_{LeftT2y} \quad \text{[Equation 18]}$$

In Equation 18, $V_{LeftT2x}$ represents a horizontal directional motion vector of a left non-neighboring block including a sample far apart from a left-bottom sample of a top neighboring block by a predetermined distance. $V_{LeftT2y}$ represents a vertical directional motion vector of t left non-neighboring block including a sample far apart from a left-bottom sample of a top neighboring block by a predetermined distance.

Alternatively, as in an example shown in FIG. 21 (b), when an x-coordinate(xNb) of a left-top sample of a top neighboring block is equal to or greater than an x-coordinate (xCb) of a left-top sample of a current block, a third affine seed vector may be derived based on a motion vector of a left neighboring block adjacent to the left of the current block and including a sample (xCb−1, yCb+subH−1) vertically far apart from the left-top sample of the current block by a predetermined distance (e.g. subH−1). Equation 19 is a diagram showing an example of deriving the third affine seed vector based on the motion vector of the neighboring block.

$$v_{2x}=V_{LeftTx}$$

$$v_{2y}=V_{LeftTy} \quad \text{[Equation 19]}$$

In Equation 19, $V_{LeftTx}$ represents a horizontal directional motion vector of a left neighboring block including a sample adjacent to a left of a current block and vertically far apart from a left-top sample of the current block by a predetermined distance. $V_{LeftTy}$ represents a vertical directional motion vector of a left neighboring block including a sample adjacent to the left of the current block and vertically far apart from the left-top sample of the current block by a predetermined distance.

Alternatively, a base sample may be set at a position different from that shown in FIGS. 18 to 21. In an example, a sample (xCb−1, yCb) adjacent to the left of the current block and having the same y-coordinate as the left-top sample of the current block or a sample (xNb, yCb) non-adjacent to the left of the current block and having the same y-coordinate as the left-top sample of the current block may be set as a base sample.

As in a described example, a first affine seed vector and a second affine seed vector of an affine merge candidate may be derived from a neighboring block positioned at a top of a current block and a third affine seed vector of an affine merge candidate may be derived from a neighboring block positioned at a left of the current block. It is also possible to derive the first affine seed vector and the third affine seed vector of the affine merge candidate from a neighboring block positioned at the left of the current block and to derive the second affine seed vector of the affine merge candidate from a neighboring block positioned at the top of the current block.

In an example shown in Equations 11 to 13, an affine seed vector of an affine merge candidate may be derived based on a difference value between a motion vector $V_{LB}$ of a left-bottom sub-block and a motion vector $V_{RB}$ of a right-bottom sub-block included in a top neighboring block. In this connection, the affine seed vector of the affine merge candidate may be derived by using a motion vector of another block instead of a motion vector of the left-bottom sub-block or the right-bottom sub-block. In an example, when a value of the motion vector $V_{LB}$ of the left-bottom sub-block and the motion vector $V_{RB}$ of the right-bottom sub-block in the top neighboring block are identical, $V_{RB}$ may be replaced with a motion vector of a block including a sample positioned at a right or bottom of the right-bottom sub-block. In an example, a motion vector of an affine merge candidate may be derived by using a motion vector of a block including a sample at a position of (xNb+NbW, yNb+NbH−1) instead of the motion vector $V_{RB}$ of the right-bottom sub-block.

Alternatively, when a value of a motion vector $V_{LB}$ of a left-bottom sub-block and a motion vector $V_{RB}$ of a right-bottom sub-block in a top neighboring block are identical, $V_{LB}$ may be replaced with a motion vector of a block including a sample positioned at a left or bottom of the left-bottom sub-block. In an example, a motion vector of an affine merge candidate may be derived by using a motion vector of a block including a sample at a position of (xNb, yNb+NbH−1+offset) instead of the motion vector $V_{LB}$ of the left-bottom sub-block. An offset may be an integer equal to or greater than 1.

Alternatively, $V_{RB}$ may be replaced with a motion vector of a block including a sample positioned at a left or bottom of a left-bottom sub-block or $V_{LB}$ may be replaced with a motion vector of a block including a sample positioned at a right or bottom of a right-bottom sub-block.

It is also possible that an affine merge candidate may be derived by combining motion vectors of a plurality of neighboring blocks adjacent to a current block. The affine merge candidate generated by combining the motion vectors of the plurality of neighboring blocks may be referred to as a combined affine merge candidate. In deriving the combined affine merge candidate, an affine seed vector at a control point may be derived from one of neighboring blocks adjacent the control point.

FIG. 22 is a diagram to explain an example of deriving a combined affine merge candidate by combining motion vectors of a plurality of neighboring blocks.

A plurality of neighboring blocks may include top neighboring blocks positioned at a top of a current block and left neighboring blocks positioned at a left of the current block. The top neighboring blocks may include at least one of a block B0 including a sample at a position of (xCb+CbW, yCb−1), a block B1 including a sample at a position of (xCb+CbW−1, yCb−1), a block B2 including a sample at a position of (xCb−1, yCb−1) or a block B3 including a sample at a position of (xCb, yCb−1). In this connection, (xCb, yCb) represents a position of a left-top sample of the current block and CbW represents a width of the current block. The left neighboring blocks may include at least one of a block A0 including a sample at a position of (xCb−1, yCb+CbH), a block A1 including a sample at a position of (xCb−1, yCb+CbH−1) or a block A2 including a sample at a position of (xCb−1, yCb). In this connection, CbH represents a height of the current block.

In addition, a plurality of neighboring blocks may further include a temporal neighboring block of the current block.

A combined affine merge candidate may be derived by combining motion information of more than two of a plurality of neighboring blocks. The combined affine merge candidate may be derived by combining motion information of 2 or 3 neighboring blocks. Concretely, the combined affine merge candidate may be derived by combining at least more than two of motion information of a neighboring block adjacent to a first control point, motion information of a neighboring block adjacent to a second control point or motion information of a neighboring block adjacent to a third control point.

In an example, a combined affine merge candidate may be derived by combining motion vectors of at least more than two of a neighboring block A2, B2 or B3 adjacent to a left-top control point CP0, a neighboring block B1 or B0 adjacent to a right-top control point CP1 or a temporal neighboring block T for a left-bottom control point CP2.

In this connection, when neighboring blocks adjacent to a control point are scanned in a predefined scanning order, a motion vector of an available neighboring block which was first found may be set as an affine seed vector at the control point. In an example, a first affine seed vector of the combined affine merge candidate for CP0 may be set as a motion vector of an available neighboring block which was first found when neighboring blocks are searched in the order of B2, B3 and A2. A second affine seed vector of the combined affine merge candidate for CP1 may be set as a motion vector of an available neighboring block which was first found when neighboring blocks are searched in the order of B1 and B0. A third affine seed vector of a combined affine merge candidate for CP2 may be set as a motion vector of an available neighboring block which was first found when neighboring blocks are searched in the order of A1 and A0.

In deriving a combined affine merge candidate, a neighboring block encoded by an affine inter-prediction mode or a neighboring block used to derive an affine merge candidate may be set to be unavailable.

FIG. 23 is a diagram showing an unavailable neighboring block.

When an affine merge candidate is derived from a neighboring block B1 positioned at a top of a current block, the neighboring block B1 may be determined to be unavailable for deriving a combined affine merge candidate. Accordingly, a motion vector of the neighboring block B1 may not be used to derive an affine seed vector of the combined affine merge candidate for CP1.

In another example, when a neighboring block is encoded by an affine inter-prediction mode, a combined affine merge candidate may be derived based on an affine vector of a sub-block including a base sample. In an example, when a neighboring block including a sample at a position of B1 is encoded by an affine inter-prediction mode, a combined merge candidate may be derived by using an affine vector of a sub-block including the sample at the position of B1 in the neighboring block.

Alternatively, considering whether a neighboring block is encoded by an affine inter-prediction mode or whether a neighboring block is derived by an affine merge candidate, a scanning order may be determined. In an example, a scanning order of a neighboring block encoded by an affine inter-prediction mode or used to derive an affine merge candidate may be set last. In an example, when a neighboring block at a position of B1 is encoded by an affine inter-prediction mode, a second affine seed vector of a combined affine merge candidate for CP2 may be derived by searching neighboring blocks in the order of B0 and B1.

When a reference picture index between neighboring blocks are different, a motion vector may be scaled based on a reference picture with the smallest index or the largest index. The scaling may be performed based on a difference value of POC (Picture Order Count) between a reference picture and a current picture.

Alternatively, a combined affine merge candidate may be generated by combining only neighboring blocks with the same reference picture index among neighboring blocks. In an example, when at least one among neighboring blocks has a reference picture index different from others, this combination may be set to be unavailable as a combined affine merge candidate. In addition, an availability of combination may be determined regardless of whether motion information or a motion vectors of neighboring blocks are the same or not. In an example, even when motion vectors of neighboring blocks (e.g. CP0 affine seed vector and CP1 affine seed vector) are the same, a combined affine merge candidate may be derived by combining neighboring blocks with the same reference picture index. Alternatively, considering reference picture indexes of neighboring blocks, the scanning order of neighboring blocks may be determined. Alternatively, the combination may be constructed by using only neighboring blocks with the same prediction direction among neighboring blocks.

According to the preset combination order, a merge candidate may be generated. In an example, the combination order may be set as follows.

1. {CP0 affine seed vector, CP1 affine seed vector, CP2 affine seed vector}
2. {CP0 affine seed vector, CP1 affine seed vector, CP3 affine seed vector}
3. {CP0 affine seed vector, CP2 affine seed vector, CP3 affine seed vector}
4. {CP1 affine seed vector, CP2 affine seed vector, CP3 affine seed vector}
5. {CP0 affine seed vector, CP1 affine seed vector}
6. {CP0 affine seed vector, CP2 affine seed vector}

There are 6 combination examples, but it is also possible to use fewer or more combination examples.

A combined affine merge candidate generated by combining 3 affine seed vectors may be referred to as a 6-parameter combined affine merge candidate and a combined affine merge candidate generated by combining 2 affine seed vectors may be referred to as a 4-parameter combined affine merge candidate.

The combination order may be predefined in an encoder and a decoder. Alternatively, it may be determined based on at least one of a size, a shape, a partition shape, or an affine motion model of a current block, a position of a current block in a coding tree unit or the POC of a reference picture. In an example, when a 4-parameter affine motion model is applied to a current block, combination examples for a 4-parameter combined affine merge candidate may be set to have a higher priority than those for a 6-parameter combined affine merge candidate.

Combined affine merge candidates are generated in a combination order, but only a combined affine merge candidate generated by combining neighboring blocks with the same reference picture may be set to be available. Alternatively, when at least one among neighboring blocks has a different reference picture, a combined affine merge candidate may be derived by scaling a motion vector based on a reference picture with the largest index or the smallest index. The scaling may be performed based on a POC difference between a current picture and the reference picture. Alternatively, when two among neighboring blocks have the same reference picture, while the other has a different reference picture, a combined affine merge candidate may be derived by scaling the motion vector of the other neighboring block based on the reference picture commonly applied to the two neighboring blocks.

The number of combined affine merge candidates added to an affine merge candidate list may be determined based on at least one of the number of affine merge candidates previously included in the affine merge candidate list or the maximum number of affine merge candidates. Alternatively, according to an affine motion model of a current block, only 6-parameter combined affine merge candidates may be added to the affine merge candidate list or only 4-parameter combined affine merge candidates may be added to the affine merge candidate list.

In an example, when the number of a combined affine merge candidate for being added to an affine merge candidate list is 1 and a 6-parameter motion model is applied to a current block, one 6-parameter combined affine merge candidate generated in a preset combination order may be added to the affine merge candidate list. Concretely, when CP0 affine seed vector, CP1 affine seed vector and CP2 affine seed vector are all available, a combined affine merge candidates consist of {CP0 affine seed vector, CP1 affine seed vector, CP2 affine seed vector} may be added to the affine merge candidate list. Alternatively, when CP2 affine seed vector is unavailable and CP3 affine seed vector is available, a combined affine merge candidate consist of {CP0 affine seed vector, CP1 affine seed vector, CP3 affine seed vector} may be added to the affine merge candidate list.

Alternatively, when the number of a combined affine merge candidate for being added to an affine merge candidate list is 1 and a 6-parameter motion model is applied to a current block, one 4-parameter combined affine merge candidate generated in a preset combination order may be added to the affine merge candidate list.

In another example, according to an affine motion model of a current block, the number of combined affine merge candidates for being added to an affine merge candidate list may be set differently. In an example, when a 6-parameter motion model is applied to the current block, 1 combined affine merge candidate may be added to the affine merge candidate list. On the other hand, when a 4-parameter motion model is applied to the current block, 2 combined affine merge candidates may be added to the affine merge candidate list.

According to the number of available affine merge candidates, a combined affine merge candidate for being added to an affine merge candidate list may be determined. In an example, when the number of an available affine merge candidate is equal to or greater than 2, only 4-parameter combined affine merge candidates may be added to the affine merge candidate list. On the other hand, when the number of an available affine merge candidate is equal to or less than 1, only 6-parameter combined affine merge candidates may be added to the affine merge candidate list. Alternatively, when the number of an available affine merge candidate is equal to or less than 1, N 6-parameter combined affine merge candidates and M 4-parameter combined affine merge candidates may be added to the affine merge candidate list. In this connection, N and M are a natural number, and M may be derived based on a number subtracting N from the maximum number of affine merge candidates. Alternatively, when the number of an available affine merge candidate is equal to or less than 1, only 4-parameter combined affine merge candidates may be added to the affine merge candidate list.

Alternatively, based on the availability of affine seed vectors, the combination order may be determined. In an example, considering the availability of affine seed vectors, a combined affine merge candidate may be added to a merge candidate list in the following order.

1. When CP0 affine seed vector, CP1 affine seed vector and CP2 affine seed vector are available
   {CP0 affine seed vector, CP1 affine seed vector, CP2 affine seed vector}
2. When CP0 affine seed vector, CP1 affine seed vector and CP3 affine seed vector are available
   {CP0 affine seed vector, CP1 affine seed vector, CP3 affine seed vector}
3. When CP0 affine seed vector, CP2 affine seed vector and CP3 affine seed vector are available
   {CP0 affine seed vector, CP2 affine seed vector, CP3 affine seed vector}
4. When CP0 affine seed vector, CP2 affine seed vector and CP3 affine seed vector are available
   {CP1 affine seed vector, CP2 affine seed vector, CP3 affine seed vector}
5. When CP0 affine seed vector and CP1 affine seed vector are available
   {CP0 affine seed vector, CP1 affine seed vector}
6. When CP0 affine seed vector and CP2 affine seed vector are available
   {CP0 affine seed vector, CP2 affine seed vector}

When the number of a combined affine merge candidate which may be added to an affine merge candidate list is 1, a combined affine merge candidate under a condition which is satisfied first among conditions in the above 1 to 6 may be added to the affine merge candidate list. When there is no case satisfying any of conditions 1 to 6 is satisfied, a combined affine merge candidate may not be added to the affine merge candidate list.

In another example, according to the number of available affine merge candidates, the maximum number of combined affine merge candidates which may be added to an affine merge candidate list may be determined.

When the number of an affine merge candidate included in an affine merge candidate list is less than the maximum number, a zero affine merge candidate whose motion vector is 0 may be added to the merge candidate list. The zero affine merge candidate means a merge candidate that values of affine seed vectors is 0. Accordingly, affine merge candidates may be derived in the following order under an affine merge mode.

1. Affine merge candidate derived from an affine neighboring block
2. Combined affine merge candidate
3. Zero affine merge candidate Based on affine seed vectors of a current block, a sub-block motion vector of each sub-block may be derived. With the sub-block motion vector of each sub-block, motion compensation for each sub-block may be performed. In performing the motion compensation, offset data may be additionally used.

Information indicating whether offset data will be used to perform motion compensation for a current block may be signaled in a bitstream. The information may be a 1-bit flag.

Alternatively, based on a size of a current block, a shape of a current block or whether affine seed vectors are identical, whether offset data will be used or not may be determined. In an example, when a 4-parameter affine motion model is applied to a current block, offset data may be set not to be used when a first affine seed vector and a second affine seed vector are the same. Alternatively, when a 6-parameter affine motion model is applied to a current block, offset data may be set not to be used when all of a first affine seed vector, a second affine seed vector and a third affine seed vector are the same or when two of the first affine seed vector, the second affine seed vector and the third affine seed vector are the same.

Offset data may represent an offset vector (or, a difference vector) or an offset vector array (or, a difference vector array) for affine seed vectors.

An affine seed vector for a current block may be updated by adding or subtracting an offset vector to or from an affine seed vector or a sub-block motion vector may be updated by adding or subtracting an offset vector to or from a sub-block motion vector.

In an example, Equations 20 and 21 below show examples in which affine seed vectors are updated.

$$CPMV[0] \cdot mvL0[0] = CPMV[0] \cdot mvL0[0] + f[0]$$

$$CPMV[0] \cdot mvL0[1] = CPMV[0] \cdot mvL0[1] + f[1]$$

$$CPMV[1] \cdot mvL0[0] = CPMV[1] \cdot mvL0[0] + f[0]$$

$$CPMV[1] \cdot mvL0[1] = CPMV[1] \cdot mvL0[1] + f[1]$$

$$CPMV[2] \cdot mvL0[0] = CPMV[2] \cdot mvL0[0] + f[0]$$

$$CPMV[2] \cdot mvL0[1] = CPMV[2] \cdot mvL0[1] + f[1] \qquad \text{[Equation 20]}$$

$$CPMV[0] \cdot mvL0[0] = CPMV[0] \cdot mvL0[0] + f[0]$$

$$CPMV[0] \cdot mvL0[1] = CPMV[1] \cdot mvL0[1] - f[1]$$

$$CPMV[1] \cdot mvL0[0] = CPMV[1] \cdot mvL0[0] + f[0]$$

$$CPMV[1] \cdot mvL0[1] = CPMV[1] \cdot mvL0[1] - f[1]$$

$$CPMV[2] \cdot mvL0[0] = CPMV[2] \cdot mvL0[0] + f[0]$$

$$CPMV[2] \cdot mvL0[1] = CPMV[2] \cdot mvL0[1] - f[1] \qquad \text{[Equation 21]}$$

CPMV[0], CPMV[1] and CPMV[2] represent a first affine seed vector, a second affine seed vector and a third affine seed vector, respectively. mvL0[0] and mvL0[1] represent a horizontal directional component of L0 directional affine seed vector and a vertical directional component of L0 directional affine seed vector, respectively. f(0) and f(1) represent a horizontal directional component of an offset vector and a vertical directional component of an offset vector, respectively.

Equations 20 and 21 represent only the update aspect of L0 directional affine seed vectors, but L1 directional affine seed vectors also may be updated by an offset vector.

As in an example shown in Equation 20, an affine seed vector may be updated by adding an offset vector to an affine seed vector. Alternatively, as in an example shown in Equation 21, an affine seed vector may be updated by adding or subtracting an offset vector to or from an affine seed vector.

Whether an offset vector will be added to or subtracted from an affine seed vector may be determined based on at least one of a temporal direction of L0 reference picture or a temporal direction of L1 reference picture. In this connection, a temporal direction may be determined based on whether POC difference between a current picture and a reference picture is a positive number or a negative number. For example, when a value subtracting a POC of a reference picture from a POC of a current picture is a positive number, it represents that the temporal direction is forward and when a value subtracting a POC of a reference picture from a POC of a current picture is a negative number, it represents that the temporal direction is backward.

In an example, when a temporal direction of L0 reference picture and a temporal direction of L1 reference picture are the same, an affine seed vector may be updated based on Equation 20. On the other hand, when a temporal direction of L0 reference picture and a temporal direction of L1 reference picture are different (e.g. when the temporal direction of L0 reference picture is forward and the temporal direction of L1 reference picture is backward or when the temporal direction of L0 reference picture is backward and the temporal direction of L1 reference picture is forward), an affine seed vector may be updated based on Equation 21.

A different offset vector may be applied per control point. In an example, Equations 22 and 23 represent examples in which affine seed vectors are updated by using a different offset vector.

$$CPMV[0]\cdot mvL0[0]=CPMV[0]\cdot mvL0[0]+f0[0]$$

$$CPMV[0]\cdot mvL0[1]=CPMV[0]\cdot mvL0[1]+f0[1]$$

$$CPMV[1]\cdot mvL0[0]=CPMV[1]\cdot mvL0[0]+f1[0]$$

$$CPMV[1]\cdot mvL0[1]=CPMV[1]\cdot mvL0[1]+f1[1]$$

$$CPMV[2]\cdot mvL0[0]=CPMV[2]\cdot mvL0[0]+f2[0]$$

$$CPMV[2]\cdot mvL0[1]=CPMV[2]\cdot mvL0[1]+f2[1] \quad \text{[Equation 22]}$$

$$CPMV[0]\cdot mvL0[0]=CPMV[0]\cdot mvL0[0]+f0[0]$$

$$CPMV[0]\cdot mvL0[1]=CPMV[0]\cdot mvL0[1]-f0[1]$$

$$CPMV[1]\cdot mvL0[0]=CPMV[1]\cdot mvL0[0]+f1[0]$$

$$CPMV[1]\cdot mvL0[1]=CPMV[1]\cdot mvL0[1]-f1[1]$$

$$CPMV[2]\cdot mvL0[0]=CPMV[2]\cdot mvL0[0]+f2[0]$$

$$CPMV[2]\cdot mvL0[1]=CPMV[2]\cdot mvL0[1]-f2[1] \quad \text{[Equation 23]}$$

As in examples shown in Equations 22 and 23, a first affine seed vector CPMV[0] may be updated with a first offset vector f0, a second affine seed vector CPMV[1] may be updated with a second offset vector f1 and a third affine seed vector CPMV[2] may be updated with a third offset vector f2.

Equations 22 and 23 represent only the update aspect of L0 directional affine seed vectors, but L1 directional affine seed vectors also may be updated by an offset vector.

As in an example shown in Equation 22, an affine seed vector may be updated by adding an offset vector to an affine seed vector. Alternatively, as in an example shown in Equation 23, an affine seed vector may be updated by adding or subtracting an offset vector to or from an affine seed vector.

Whether an offset vector will be added to or subtracted from an affine seed vector may be determined based on at least one of a temporal direction of L0 reference picture or a temporal direction of L1 reference picture. In an example, when the temporal direction of L0 reference picture and the temporal direction of L1 reference picture are the same, an affine seed vector may be updated based on Equation 22. On the other hand, when the temporal direction of L0 reference picture and the temporal direction of L1 reference picture are different (e.g. when the temporal direction of L0 reference picture is forward and the temporal direction of L1 reference picture is backward, or when the temporal direction of L0 reference picture is backward and the temporal direction of L1 reference picture is forward), an affine seed vector may be updated based on Equation 23.

In another example, a first offset vector may be commonly applied to 2 of 3 affine seed vectors and a second offset vector may be applied to the other. For example, the first affine seed vector CPMV[0] and the second affine seed vector CPMV[1] may be updated with the first offset vector f0 and the third affine seed vector CPMV[2] may be updated with the second offset vector f1. Alternatively, the first affine seed vector CPMV[0] and the third affine seed vector CPMV[2] may be updated with the first offset vector f0 and the second affine seed vector CPMV[1] may be updated with the second offset vector f1.

In another example, a current block may be partitioned into a plurality of sub-blocks and an offset vector may be set per sub-block. And, an affine seed vector of a control point may be updated by using an offset vector assigned to a sub-block adjacent to the control point.

FIG. 24 is a diagram showing an example in which a current block is partitioned into 2 sub-blocks.

A current block may be partitioned into 2 sub-blocks and an offset vector may be set per sub-block. And then, an affine seed vector of a control point adjacent to a sub-block may be updated by using the offset vector assigned to the sub-block.

In an example, as in an example shown in FIG. 24 (a), when a current block is partitioned into 2 sub-blocks by a vertical line, a first affine seed vector CPMV[0] of a first control point and a third affine seed vector CPMV[2] of a third control point adjacent to a left sub-block in the current block may be updated based on an offset vector f0 assigned to the left sub-block. On the other hand, a second affine seed vector CPMV[1] of a second control point adjacent to a right sub-block in the current block may be updated based on an offset vector f1 assigned to the right sub-block.

Alternatively, as in an example shown in FIG. 24 (b), when a current block is partitioned into 2 sub-blocks by a horizontal line, a first affine seed vector CPMV[0] of a first control point and a second affine seed vector CPMV[1] of a second control point adjacent to a top sub-block in the current block may be updated based on an offset vector f0 assigned to the top sub-block. On the other hand, a third affine seed vector CPMV[2] of a third control point adjacent to a bottom sub-block in the current block may be updated based on an offset vector f1 assigned to the bottom sub-block.

In deriving an affine merge candidate, the above-described method of updating an affine seed vector may be applied. In an example, after deriving an affine merge candidate from a neighboring block adjacent to a current block, affine seed vectors of the derived affine merge candidate may be updated by using an offset vector. Afterwards, the derived affine merge candidate may be replaced with an updated affine merge candidate or the updated affine merge candidate may be added to a merge candidate list as a new affine merge candidate. When the updated affine merge candidate is used as a new affine merge candidate, affine merge candidates may be derived in the following order.

1. Affine merge candidate derived from an affine neighboring block
2. Combined affine merge candidate
3. Affine merge candidate updated based on an offset vector
4. Zero affine merge candidate Information for determining an offset vector may be signaled in a bitstream. In an example, index information indicating any one of a plurality of offset vector candidates may be signaled in a bitstream.

The number of offset vector candidates may be 4, 8 or 16. In an example, 4 offset vector sets may be defined as follows.

{(4, 0), (0, 4), (−4, 0), (0, −4)}

8 offset vector sets may be defined as follows.

{(4, 0), (0, 4), (−4, 0), (0, −4), (8, 0), (0, 8), 8, 0), (0, −8)}

16 offset vector sets may be defined as follows.

{(4, 0), (0, 4), (−4, 0), (0, −4), (−4, −4), (4, −4), (4, 4), (−4, 4), (8, 0), (0, 8), (−8, 0), (0, −8), (−8, −8), (8, −8), (8, 8), (−8, 8)}

The above-mentioned offset vector set enumerates offset vector candidates included by an offset vector set. In this connection, in (x, y), x represents a horizontal directional component of an offset vector candidate (i.e. an x-axis component) and y represents a vertical directional component of an offset vector candidate (i.e. a y-axis component).

The number of offset vector candidates may be determined based on at least one of an affine motion model for a current block or the number of sub-blocks included in the current block. Alternatively, information for determining the number of offset vector candidates may be signaled in a bitstream. For example, the information may specify any one of a plurality of offset vector sets.

The same offset vector may be applied to control points. In an example, if index information specifying any one of offset vector candidates included in an offset vector set is signaled, all affine seed vectors may be updated based on an offset vector candidate specified by the index information.

Alternatively, an offset vector may be determined per control point. In this connection, an offset vector for each control point may be derived from a single offset vector set. In an example, if any one of a plurality of offset vector sets is specified, an offset vector of each control point may be derived among offset vector candidates included in the specified offset vector set. For it, index information for specifying an offset vector candidate may be signaled per control point.

In this connection, the offset vector of each control point may not be derived from the same offset vector candidate. In an example, if a first offset vector is derived from a first offset vector candidate, a second offset vector may be derived from any one of the remaining offset vector candidates except for the first offset vector candidate.

Alternatively, each control point may be set to use a different offset vector set. In an example, while an offset vector is derived by using a first offset vector set {(4, 0), (0, 4), (−4, 0), (0, −4)} for a first control point, an offset vector may be derived by using a second offset vector set {(4, 4), (−4, 4), (−4, −4), (4, −4)} for a second control point.

In another example, a new offset vector may be derived by using pre-derived offset vectors. In an example, if a first offset vector for a first affine seed vector and a second offset vector for a second affine seed vector are determined, a third offset vector for a third affine seed vector may be derived based on the first and second offset vectors. The following Equation 24 shows an example of deriving the third offset vector based on the first offset vector and the second offset vector.

$$f2[0] = (f0[0] + f1[0] + 1) \gg 1$$

$$f2[1] = (f0[1] + f1[1] + 1) \gg 1 \qquad \text{[Equation 24]}$$

As in an example shown in the above Equation 24, an average value of the first offset vector and the second offset vector may be set as the third offset vector.

Alternatively, based on the weighted sum operation of the first offset vector and the second offset vector, the third offset vector may be derived. In this connection, weights applied to the first offset vector and the second offset vector may be determined based on a size or shape of a current block. The following Equation 25 shows an example of deriving the third offset vector based on the weighted sum operation of the first offset vector and the second offset vector.

$$f2[0] = ((16 - \text{whRatio}) * f0[0] + \text{whRatio} * f1[0] + 1) \gg 4$$

$$f2[1] = ((16 - \text{whRatio}) * f0[1] + \text{whRatio} * f1[1] + 1) \gg 4 \qquad \text{[Equation 25]}$$

In the Equation 25, whRatio represents the ratio of a width and height of a current block. whRatio may be derived as in the following Equation 26.

$$\text{whRatio} = \text{Abs}(\text{Log}_2(\text{nCbW}/\text{nCbH})) \qquad \text{[Equation 26]}$$

In Equation 26, nCbW represents a width of a coding block and nCbH represents a height of a coding block.

As in an example shown in Equation 25, a wight applied to the first offset vector f0 and the second offset vector may be determined by using the ratio of the width and height of the current block.

An offset vector may be set per sub-block or sample. In other words, an offset vector (or a difference vector) or an offset vector array (or, a difference vector array) for sub-blocks or samples may be defined as offset data.

For example, if a sub-block motion vector is derived based on affine seed vectors, motion compensation for a sub-block may be performed by using the derived sub-block motion vector. In this connection, an offset vector per sub-block or sample may be additionally used in performing the motion compensation.

An offset vector may be derived per sub-block or sample.

FIG. 25 is a diagram showing an example in which an offset vector is derived per sub-block.

As in an example shown in (a) and (b) of FIG. 25, when a current block is partitioned into 2 sub-blocks, an offset vector may be derived for each of 2 sub-blocks. In an example, motion compensation for a first sub-block may be performed by using a sub-block motion vector of the first sub-block and a first offset vector f0 and motion compensation for a second sub-block may be performed by using a sub-block motion vector of the second sub-block and a second offset vector f1.

Alternatively, as in an example shown in FIG. 25 (c), when a current block is partitioned into 4 sub-blocks, an offset vector may be derived for each of 4 sub-blocks. In an example, motion compensation for a first sub-block may be performed by using a first offset vector f0 and motion compensation for a second sub-block may be performed by using a second offset vector f1. In addition, motion compensation for a third sub-block may be performed by using a third offset vector f2 and motion compensation for a fourth sub-block may be performed by using a fourth offset vector f3.

A current block may be partitioned into more sub-blocks than shown.

An offset vector for a sub-block may be derived by using an offset vector candidate or a pre-derived offset vector. As a method of deriving an offset vector from an offset vector candidate and a method of deriving an offset vector with a pre-derived offset vector are described in detail as above, detailed explanation is omitted.

Based on an offset vector, a sub-block motion vector may be updated and based on the updated sub-block motion vector, motion compensation for a sub-block may be performed. In an example, Equations 27 and 28 show examples in which a sub-block motion vector is updated based on an offset vector.

$$SubMV[0]\cdot mvL0[0]=SubMV[0]\cdot mvL0[0]+f0[0]$$
$$SubMV[0]\cdot mvL0[1]=SubMV[0]\cdot mvL0[1]+f0[1]$$
$$SubMV[1]\cdot mvL0[0]=SubMV[1]\cdot mvL0[0]+f1[0]$$
$$SubMV[1]\cdot mvL0[1]=SubMV[1]\cdot mvL0[1]+f1[1]$$
$$SubMV[2]\cdot mvL0[0]=SubMV[2]\cdot mvL0[0]+f2[0]$$
$$SubMV[2]\cdot mvL0[1]=SubMV[2]\cdot mvL0[1]+f2[1]$$
$$SubMV[3]\cdot mvL0[0]=SubMV[3]\cdot mvL0[0]+f3[0]$$
$$SubMV[3]\cdot mvL0[1]=SubMV[3]\cdot mvL0[1]+f3[1] \quad \text{[Equation 27]}$$

$$SubMV[0]\cdot mvL0[0]=SubMV[0]\cdot mvL0[0]+f0[0]$$
$$SubMV[0]\cdot mvL0[1]=SubMV[0]\cdot mvL0[1]-f0[1]$$
$$SubMV[1]\cdot mvL0[0]=SubMV[1]\cdot mvL0[0]+f1[0]$$
$$SubMV[1]\cdot mvL0[1]=SubMV[1]\cdot mvL0[1]-f1[1]$$
$$SubMV[2]\cdot mvL0[0]=SubMV[2]\cdot mvL0[0]+f2[0]$$
$$SubMV[2]\cdot mvL0[1]=SubMV[2]\cdot mvL0[1]-f2[1]$$
$$SubMV[3]\cdot mvL0[0]=SubMV[3]\cdot mvL0[0]+f3[0]$$
$$SubMV[3]\cdot mvL0[1]=SubMV[3]\cdot mvL0[1]-f3[1] \quad \text{[Equation 28]}$$

In Equations 27 and 28, SubMV[0] represents a sub-block motion vector of a first sub-block and SubMV[1] represents a sub-block motion vector of a second sub-block. SubMV[3] represents a sub-block motion vector of a third sub-block. Hereinafter, a sub-block motion vector of N-th sub-block is referred to as a Nth sub-block motion vector.

As in an example shown in Equations 27 and 28, the first sub-block motion vector SubMV[0] may be updated by using a first offset vector f0, the second sub-block motion vector SubMV[1] may be updated by using a second offset vector f1 and the third sub-block motion vector SubMV[2] may be updated by using a third offset vector f2.

Equations 27 and 28 show only an update aspect of L0 directional sub-block motion vectors, but L1 directional sub-block motion vectors also may be updated by an offset vector.

As in an example shown in Equation 27, an affine seed vector may be updated by adding an offset vector to a sub-block motion vector. Alternatively, as in an example shown in Equation 28, an affine seed vector may be updated by adding or subtracting an offset vector to or from a sub-block motion vector.

Whether an offset vector will be added to or subtracted from an affine seed vector may be determined based on at least one of a temporal direction of L0 reference picture or a temporal direction of L1 reference picture. In an example, when the temporal direction of L0 reference picture and the temporal direction of L1 reference picture are the same, a sub-block motion vector may be updated based on Equation 27. On the other hand, when the temporal direction of L0 reference picture and the temporal direction of L1 reference picture are different (e.g. when the temporal direction of L0 reference picture is forward and the temporal direction of L1 reference picture is backward or when the temporal direction of L0 reference picture is backward and the temporal direction of L1 reference picture is forward), a sub-block motion vector may be updated based on Equation 28.

An offset vector may be derived per prediction sample in a sub-block. Concretely, based on a position of each prediction sample in a sub-block, an offset vector for each prediction sample may be derived. In this connection, the position of the prediction sample may be determined based on a left-top sample of a sub-block.

An x component of an offset vector for a prediction sample may be derived based on a value multiplying a difference value between an x component of a second affine seed vector and an x component of a first affine seed vector x component by the x-axis coordinate of the prediction sample and a value multiplying a difference value between a y component of the second affine seed vector and a y component of the first affine seed vector by a y-axis coordinate of the prediction sample. In addition, a y component of the offset vector for the prediction sample may be derived based on a value multiplying a difference value between an x component of a third affine seed vector and an x component of the first affine seed vector by the x-axis coordinate of the prediction sample and a value multiplying a difference value between a y component of the third affine seed vector and a y component of the second affine seed vector by the y-axis coordinate of the prediction sample.

When a 4-parameter motion model is applied to a current block, a y component of an offset vector may be derived based on a value multiplying a difference value between an x component of the first affine seed vector and an x component of the second affine seed vector by the x-axis coordinate of the prediction sample and a value multiplying a difference value between a y component of the second affine seed vector and a y component of the first affine seed vector by the y-axis coordinate of the prediction sample.

As described above, offset vectors of prediction samples in a sub-block may have a value different from each other. But, an offset vector array for prediction samples may be commonly applied to all sub-blocks. In other words, an offset vector array applied to a first sub-block and an offset vector array applied to a second sub-block may be the same.

Alternatively, considering a position of a sub-block, an offset vector array for samples may be derived. In this case, a different offset vector array may be applied between sub-blocks.

After performing motion compensation for a sub-block based on a sub-block motion vector, each prediction sample may be updated based on an offset vector. A prediction sample may be updated based on the offset vector of the prediction sample and a gradient for the prediction sample.

A gradient for a prediction sample may be derived based on a difference value of prediction samples. A gradient for a first prediction sample may be derived based on a difference value between prediction samples belonging to the same line as the first prediction sample or a difference value between prediction samples belonging to a line neighboring the first prediction sample.

In an example, a gradient for the first prediction sample may be derived by a difference value between the first prediction sample and another prediction sample belonging to the same line as the first prediction sample. Concretely, a horizontal directional gradient of the first prediction sample may be derived by a difference value between the first prediction sample and a second prediction sample belonging to the same row as the first prediction sample and a vertical directional gradient of the first prediction sample may be derived by a difference value between the first prediction sample and a third prediction sample belonging to the same column as the first prediction sample. In this connection, the second prediction sample and the third prediction sample may neighbor the first prediction sample. In an example, the second prediction sample may be positioned at a left or right of the first prediction sample and the third prediction sample may be positioned at a top or bottom of the first prediction sample. Alternatively, the second prediction sample and the third prediction sample may be far apart from the first prediction sample by a predetermined distance in an x-axis or y-axis direction. In this connection, a predetermined distance may be a natural number such as 1, 2 or 3, etc.

Alternatively, a difference value of prediction samples belonging to a line adjacent to the first prediction sample may be set as a gradient for the first prediction sample. In an example, a horizontal directional gradient for the first prediction sample may be derived by a difference value of prediction samples belonging to a row adjacent to the first prediction sample. In this connection, the row adjacent to the first prediction sample may mean a top row or bottom row of the first prediction sample. Among prediction samples used to derive the horizontal directional gradient of the first prediction sample, at least one may be adjacent to the first prediction sample and the other may be not adjacent to the first prediction sample. In an example, the horizontal directional gradient for the first prediction sample may be derived based on a difference value between a second prediction sample positioned at the top or bottom of the first prediction sample and a third prediction sample far apart from the second prediction sample by a predetermined distance in an x-axis direction. A vertical directional gradient for the first prediction sample may be derived by a difference value of prediction samples belonging to a column adjacent to the first prediction sample. In this connection, the column adjacent to the first prediction sample may mean a left or right column of the first prediction sample. Among prediction samples used to derive the vertical directional gradient of the first prediction sample, at least one may be adjacent to the first prediction sample and the other may be not adjacent to the first prediction sample. In an example, a vertical directional gradient for the first prediction sample may be derived based on a difference value between a fourth prediction sample positioned at the left or right of the first prediction sample and a fifth prediction sample far apart from the fourth prediction sample by a predetermined distance in an y-axis direction. In this connection, the predetermined distance may be a natural number such as 1, 2, or 3, etc.

Equation 29 shows an example of deriving a horizontal directional gradient gradientH and a vertical directional gradient gradientV for the first prediction sample.

$$gradientH[x][y]=(predSample[x+2][y+1]-predSample[x][y+1])\gg shift1$$

$$gradientV[x][v]=(predSample[x+1][y+2]-predSample[x+1][y])\gg shift1 \quad \text{[Equation 29]}$$

In Equation 29, predSample represents a prediction sample and [x][y] represents an x-axis coordinate and an y-axis coordinate. shift1 represents a shifting parameter. The shifting parameter may have a predefined value in an encoder and a decoder. Alternatively, the shifting parameter may be adaptively determined based on at least one of a size, shape, an aspect ratio or an affine motion model of a current block.

If a gradient for a prediction sample is derived, an offset prediction value for the prediction sample may be derived by using the gradient and an offset vector. The offset prediction value may be derived based on a multiplying operation of the gradient and the offset vector. In an example, Equation 30 represents an example of deriving the offset prediction value OffsetPred.

$$OffsetPred[x][y]=gradientH[x][y]*offsetMV[x][y][0]+gradientV*offsetMV[x][y][1] \quad \text{[Equation 30]}$$

If an offset prediction value is derived, a prediction sample may be updated by adding the offset prediction value to the prediction sample. Equation 31 represents an example of updating the prediction sample.

$$predSample[x][y]=predSample[x][y]+OffsetPred[x][y] \quad \text{[Equation 31]}$$

In another example, a prediction sample may be updated by adding an offset vector to a surrounding prediction sample. In this connection, the surrounding prediction sample may include at least one of a sample positioned at a right of the prediction sample, a sample positioned at a bottom of the prediction sample or a sample positioned at a right-bottom of the prediction sample. In an example, Equation 32 represents an example of updating the prediction sample by using a surrounding prediction sample.

$$predSample[x][y]=predSample[x+1][y+1]+OffsetPred[x][y] \quad \text{[Equation 32]}$$

Information indicating whether an offset vector will be used in performing motion compensation for a current block may be signaled in a bitstream. The information may be a 1-bit flag.

Alternatively, whether an offset vector is used may be determined based on a size of a current block, a shape of a current block or whether affine seed vectors are the same. In an example, when a 4-parameter affine motion model is applied to the current block, motion compensation may be performed by using an offset vector if a first affine seed vector and a second affine seed vector are mutually identical. Alternatively, when a 6-parameter affine motion model is applied to the current block, motion compensation may be performed by using an offset vector if all of a first affine seed vector, a second affine seed vector and a third affine seed vector are the same or if two of the first affine seed vector, the second affine seed vector and the third affine seed vector are the same.

Next, an inter-prediction method using translation motion information is described in detail.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 26 is a flow diagram of a process deriving the motion information of a current block under a merge mode.

The merge candidate of a current block may be derived S2601. The merge candidate of a current block may be derived from a block encoded/decoded by inter-prediction prior to a current block.

FIG. 27 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H-1), (W-1, −1), (W, −1), (−1, H) or (−1, 1) may be used as a candidate block. In reference to a diagram, the neighboring blocks of index 0 to 4 may be used as candidate blocks.

A non-neighboring base sample represents a sample that at least one of a x-axis distance or a y-axis distance with a base sample adjacent to a current block has a predefined value. In an example, at least one of a block including a base sample that a x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

Alternatively, a candidate block not belonging to the same coding tree unit as a current block may be set to be unavailable as a merge candidate. In an example, when a base sample is out of an upper boundary of a coding tree unit to which a current block belongs, a candidate block including the base sample may be set to be unavailable as a merge candidate.

A merge candidate may be derived from a temporal neighboring block included in a picture different from a current block. In an example, a merge candidate may be derived from a collocated block included in a collocated picture. Any one of reference pictures included in a reference picture list may be set as a collocated picture. Index information identifying a collocated picture among reference pictures may be signaled in a bitstream. Alternatively, a reference picture with a predefined index among reference pictures may be determined as a collocated picture.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S2602.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S2603. Concretely, information for specifying any one of a plurality of merge candidates may be signaled in a bitstream. In an example, information, merge_idx, representing an index of any one of merge candidates included in a merge candidate list may be signaled in a bitstream.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 28 is a diagram to explain the update aspect of a motion information table.

For a current block, when inter-prediction is performed S2801, a motion information candidate may be derived based on a current block S2802. The motion information of a motion information candidate may be set the same as that of a current block.

When a motion information table is empty S2803, a motion information candidate derived based on a current block may be added to a motion information table S2804.

When a motion information table already includes a motion information candidate S2803, a redundancy check for the motion information of a current block (or, a motion information candidate derived based on it) may be performed S2805. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S2808. Whether motion information candidates are identical may be determined based on whether the motion information (e.g. a motion vector/a reference picture index, etc.) of motion information candidates is identical.

In this connection, when the maximum number of motion information candidates are already stored in a motion information table S2806, the oldest motion information candidate may be deleted S2807 and a motion information candidate derived based on a current block may be added to a motion information table S2808. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 29 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 29, n).

When a motion information candidate identical to a motion information candidate derived based on a current block is prestored S2805, a motion information candidate derived based on a current block may not be added to a motion information table S2809.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 30 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 30 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

When motion compensation prediction is performed per sub-block basis, a motion information candidate may be derived based on the motion information of a representative sub-block among a plurality of sub-blocks included in a current block. In an example, when a sub-block merge candidate is used for a current block, a motion information candidate may be derived based on the motion information of a representative sub-block among sub-blocks.

The motion vector of sub-blocks may be derived in the following order. First, any one of merge candidates included in the mere candidate list of a current block may be selected and an initial shift vector (shVector) may be derived based on the motion vector of a selected merge candidate. And, a shift sub-block that a base sample is at a position of (xColSb, yColSb) may be derived by adding an initial shift vector to the position (xSb, ySb) of the base sample of each sub-block in a coding block (e.g. a left-top sample or a center sample). The below Equation 1 shows a formula for deriving a shift sub-block.

(xColSb,yColSb)=(xSb+shVector[0]>>4,ySb+shVector[1]>>4)

Then, the motion vector of a collocated block corresponding to the center position of a sub-block including (xColSb, yColSb) may be set as the motion vector of a sub-block including (xSb, ySb).

A representative sub-block may mean a sub-block including the left-top sample or center sample of a current block.

FIG. 31 is a diagram showing the position of a representative sub-block.

FIG. 31 (a) shows an example in which a sub-block positioned at the left-top of a current block is set as a representative sub-block and FIG. 31 (b) shows an example in which a sub-block positioned at the center of a current block is set as a representative sub-block. When motion compensation prediction is performed in a basis of a sub-block, the motion information candidate of a current block may be derived based on the motion vector of a sub-block including the left-top sample of a current block or including the central sample of a current block.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

Alternatively, a motion information candidate may be derived based on at least one sub-block motion vector of a sub-block included in a block encoded/decoded based on an affine motion model. In an example, a motion information candidate may be derived by using a sub-block positioned at the left-top, the center or the right-top of a current block. Alternatively, the average value of the sub-block motion vectors of a plurality of sub-blocks may be set as the motion vector of a motion information candidate.

Alternatively, a motion information candidate may be derived based on the average value of the affine seed vectors of a block encoded/decoded based on an affine motion model. In an example, at least one average of the first affine seed vector, the second affine seed vector or the third affine seed vector of a current block may be set as the motion vector of a motion information candidate.

Alternatively, a motion information table may be configured per inter-prediction mode. In an example, at least one of a motion information table for a block encoded/decoded by an intra block copy, a motion information table for a block encoded/decoded based on a translation motion model or a motion information table for a block encoded/decoded based on an affine motion model may be defined. According to the inter-prediction mode of a current block, any one of a plurality of motion information tables may be selected.

FIG. 32 shows an example in which a motion information table is generated per inter-prediction mode.

When a block is encoded/decoded based on a non-affine motion model, a motion information candidate mvCand derived based on the block may be added to a non-affine motion information table HmvpCandList. On the other hand, when a block is encoded/decoded based on an affine motion model, a motion information candidate mvAfCand derived based on the above model may be added to an affine motion information table HmvpCandList.

The affine seed vectors of the above block may be stored in a motion information candidate derived from a block encoded/decoded based on an affine motion model. Accordingly, the motion information candidate may be used as a merge candidate for deriving the affine seed vectors of a current block.

An additional motion information table may be defined in addition to the described motion information table. A long-term motion information table (hereinafter, referred to as the second motion information table) may be defined in addition to the above-described motion information table (hereinafter, referred to as the first motion information table). In this connection, a long-term motion information table includes long-term motion information candidates.

When both the first motion information table and the second motion information table are empty, first, a motion information candidate may be added to the second motion information table. After the number of motion information candidates available for the second motion information table reaches the maximum number, a motion information candidate may be added to the first motion information table.

Alternatively, one motion information candidate may be added to both the second motion information table and the first motion information table.

In this connection, a second motion information table which is fully filled may not perform an update anymore. Alternatively, when a decoded region in a slice is over a predetermined ratio, the second motion information table may be updated. Alternatively, the second motion information table may be updated per N coding tree unit line.

On the other hand, the first motion information table may be updated whenever an encoded/decoded block is generated by inter-prediction. But, a motion information candidate added to the second motion information table may be set not to be used to update the first motion information table.

Information for selecting any one of the first motion information table or the second motion information table may be signaled in a bitstream. When the number of a merge candidate included in a merge candidate list is less than the threshold, motion information candidates included in a motion information table indicated by the information may be added to a merge candidate list as a merge candidate.

Alternatively, a motion information table may be selected based on a size of a current block, a shape of the current block, an inter-prediction mode of the current block, whether bidirectional prediction is applied to the current block, whether a motion vector is refined or whether a triangular partitioning is applied to the current block.

Alternatively, when the number of merge candidates included in a merge candidate list is less than the maximum number even though a motion information candidate included in the first motion information table is added, a motion information candidate included in the second motion information table may be added to a merge candidate list.

FIG. 33 is a diagram showing an example in which a motion information candidate included in a long-term motion information table is added to a merge candidate list.

In case that the number of a merge candidate included in a merge candidate list is less than the maximum number, a motion information candidate included in the first motion information table HmvpCandList may be added to a merge candidate list. In When the number of a merge candidate included in the merge candidate list is less than the maximum number even though motion information candidates included in the first motion information table is added to a merge candidate list, a motion information candidate included in a long-term motion information table HmvpLICandList may be added to the merge candidate list.

Table 1 shows a process in which motion information candidates included in a long-term information table are added to a merge candidate list.

TABLE 1

For each candidate in HMVPCandList with index HMVPLTIdx = 1..numHMVPLTCand, the following ordered steps are repeated until combStop is equal to true
 - sameMotion is set to FALSE
 - If hmvpStop is equal to FALSE and numCurrMergecand is less than (MaxNumMergeCand-1), hmvpL is set to TRUE
 - If HMVPLTCandList[NumLTHmvp-HMVPLTIdx] have the same motion vectors and the same reference indices with any mergeCandList[i] with I being 0..numOrigMergeCand-1 and HasBeenPruned[i] equal to false, sameMotion is set to true
 - If sameMotion is equal to false,
mergeCandList[numCurrMergeCand++]

TABLE 1-continued is set to HMVPLTCandList[NumLTHmvp-HMVPLTIdx]
 - If numCurrMergeCand is equal to (MaxNumMergeCand-1), hmvpLTStop is set to TRUE A motion information candidate may be set to include additional information except for motion information. In an example, at least one of a size, shape or partition information of a block may be additionally stored in a motion information candidate. When the merge candidate list of a current block is configured, only motion information candidate whose a size, shape or partition information is identical or similar to a current block among motion information candidates may be used or a motion information candidate whose a size, shape or partition information is identical or similar to a current block may be added to a merge candidate list in advance.

Alternatively, a motion information table may be generated per block size, shape or partition information. The merge candidate list of a current block may be configured by using a motion information table matching the shape, size or partition information of a current block among a plurality of motion information tables.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

In an example, Table 2 shows a process in which a motion information candidate is added to a merge candidate list.

TABLE 2

For each candidate in HMVPCandList with index HMVPIdx-1..numCheckedHMVPCand, the following ordered steps are repeated until combStop is equal to true
 - sameMotion is set to false
 - If HMVPCandList[NumHmvp-HMVPIdx] have the same motion vectors and the same reference indices with any mergeCandList[i] with I being 0..numOrigMergeCand-1 and HasBeenPruned[i] equal to false, sameMotion is set to true
 - If sameMotion is equal to false,
mergeCandList[numCurrMergeCand++]
is set to HMVPCandList[NumHmvp-HMVPIdx]
 - If numCurrMergeCand is equal to (MaxNumMergeCand-1), hmvpStop is set to TRUE A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index.

Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 34 is a diagram showing an example in which a redundancy check is performed only for a part of merge candidates.

When a motion information candidate HmvpCand[j] is added to a merge candidate list, a redundancy check with 2 merge candidates with the largest index, mergeCandList[NumMerge−2] and mergeCandList[NumMerge−1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether mergeCandList[0] and mergeCandList[1] are identical to HmvpCand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList[NumMerge−2] and mergeCandList[NumMerge−1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 35 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i−1] whose index is i−1 and merge candidates may be performed without adding the motion information candidate HmvpCand[i] to a merge candidate list. In this connection, a redundancy check between the motion information candidate HmvpCand[i−1] and the merge candidate mergeCandList[j] may be omitted.

In an example, in an example shown in FIG. 35, it was determined that HmvpCand[i] and mergeCandList[2] are identical. Accordingly, a redundancy check for HmvpCand[i−1] may be performed without adding HmvpCand[i] to a merge candidate list. In this connection, a redundancy check between HmvpCand[i−1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate—Temporal merge candidate—Motion information candidate—(Affine motion information candidate)—Pairwise merge candidate—Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

A motion information table may be used in a motion vector prediction mode. In an example, when the number of a motion vector prediction candidate included in the motion vector prediction candidate list of a current block is less than the threshold, a motion information candidate included in a motion information table may be set as a motion vector prediction candidate for a current block. Concretely, the motion vector of a motion information candidate may be set as a motion vector prediction candidate.

If any one of motion vector prediction candidates included in the motion vector prediction candidate list of a current block is selected, a selected candidate may be set as a motion vector predictor of a current block. Then, after the motion vector residual value of a current block is decoded, the motion vector of a current block may be obtained by adding up the motion vector predictor and the motion vector residual value.

The motion vector prediction candidate list of a current block may be configured in the following order.

Spatial motion vector prediction candidate—Temporal motion vector prediction candidate—Motion information candidate—(Affine motion information candidate)—Zero motion vector prediction candidate A spatial motion vector prediction candidate means a motion vector prediction candidate derived from at least one of a neighboring block or a non-neighboring block and a temporal motion vector prediction candidate means a motion vector prediction candidate derived from a previous reference picture. An affine motion information candidate represents a motion information candidate derived from a block encoded/decoded by an affine motion model. A zero motion vector prediction candidate represents a candidate that the value of a motion vector is 0.

Intra-prediction is a method for performing prediction on a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra-prediction is a method of obtaining a prediction block of a current block on the basis of a non-directional intra-prediction mode or directional intra-prediction mode.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

A transform method may be determined on a basis of a block. A transform method may be determined on the basis of at least one of a prediction encoding mode for a current block, a size of the current block, or a size of the current block. In an example, when a current block is encoded through an intra-prediction mode, and a size of the current block is smaller than N×N, transform may be performed by using a transform method of DST. On the other hand, when the above condition is not satisfied, transform may be performed by using a transform method of DCT.

For a partial block of a residual image, two-dimensional image transform may not be performed. Not performing two-dimensional image transform may be referred to as transform skip. When transform skip is applied, quantization may be applied to residual values for which transform is not performed.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DCT7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. In this connection, a transform coefficient for remaining regions for which second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for transform in the horizontal direction and transform in the vertical direction, the second transform may be allowed.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

The decoder may perform inverse-transform (second inverse-transform) to the second transform and may perform inverse-transform (first inverse-transform) to the first transform resultant from the second inverse-transform. As a result of performing the second inverse-transform and the first inverse-transform, residual signals for the current block may be obtained.

When transform and quantization are performed by the encoder, the decoder may obtain the residual block via inverse-quantization and inverse-transform. The decoder may add the prediction block and the residual block to each other to obtain the reconstructed block for the current block.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF).

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes video.

What is claimed is:

1. A method of decoding a video, the method comprising:
   determining control point motion vectors for a current block;
   generating an affine merge candidate list for the current block;
   specifying one of a plurality of affine merge candidates included in the affine merge candidate list;
   deriving a motion vector for a sub-block in the current block based on the control point motion vectors and the specified affine merge candidate, the sub-block being a smaller region than the current block;
   deriving offset data for the sub-block; and
   generating prediction samples of the sub-block based on the motion vector and the offset data,
   wherein a prediction sample in the sub-block is obtained based on a first prediction sample derived based on the motion vector of the sub-block and an offset value, the offset value being derived based a differential vector for the prediction sample.

2. The method of claim 1, wherein the offset data is an array of differential vectors each of which corresponds to each of prediction samples in the sub-block.

3. The method of claim 1, wherein the offset value is derived based on a horizontal directional gradient and a vertical directional gradient for the prediction sample.

4. The method of claim 1, wherein whether the offset data is used in generating the prediction samples is determined based on whether the control point motion vectors are mutually the same or not.

5. A method of encoding a video, the method comprising:
   determining control point motion vectors for a current block;
   generating an affine merge candidate list for the current block;
   specifying one of a plurality of affine merge candidates included in the affine merge candidate list;
   deriving a motion vector for a sub-block in the current block based on the control point motion vectors and the specified affine merge candidate, the sub-block being a smaller region than the current block;
   deriving offset data for the sub-block; and
   generating prediction samples of the sub-block based on the motion vector and the offset data,
   wherein a prediction sample in the sub-block is obtained based on a first prediction sample derived based on the motion vector of the sub-block and an offset value, the offset value being derived based a differential vector for the prediction sample.

6. The method of claim 5, wherein the offset data is an array for differential vectors each of which corresponds to each of prediction samples in the sub-block.

7. The method of claim 5, wherein the offset value is derived based on a horizontal directional gradient and a vertical directional gradient for the prediction sample.

8. The method of claim 5, wherein whether the offset data is used in generating the prediction samples is determined based on whether the control point motion vectors are mutually the same or not.

9. A non-transitory computer readable medium having stored thereon a compressed video data, the compressed video data comprising:
   index information specifying one of a plurality of affine merge candidates included in an affine merge candidate list,
   wherein a motion vector for a sub-block in the current block is derived based on control point motion vectors of the current block and the specified affine merge candidate, the sub-block being a smaller region than the current block;

wherein prediction samples of the sub-block are generated based on the motion vector and offset data for the sub-block, and wherein a prediction sample in the sub-block is obtained based on a first prediction sample derived based on the motion vector of the sub-block and an offset value, the offset value being derived based a differential vector for the prediction sample.

10. The non-transitory computer readable medium of claim 9, wherein whether the offset data is used in generating the prediction samples is determined based on whether the control point motion vectors are mutually the same or not.

* * * * *